(12) United States Patent
Steffl

(10) Patent No.: US 9,695,861 B2
(45) Date of Patent: Jul. 4, 2017

(54) SPLIT NUT COMPRESSION FASTENER SYSTEM

(75) Inventor: Kevin Steffl, Vancouver, WA (US)

(73) Assignee: QwikLine Industrial Products, Inc., West Linn, OR (US)

( * ) Notice: Subject to any disclaimer, the term of this patent is extended or adjusted under 35 U.S.C. 154(b) by 382 days.

(21) Appl. No.: 14/236,882

(22) PCT Filed: Aug. 3, 2012

(86) PCT No.: PCT/US2012/049473
§ 371 (c)(1),
(2), (4) Date: Feb. 3, 2014

(87) PCT Pub. No.: WO2013/020027
PCT Pub. Date: Feb. 7, 2013

(65) Prior Publication Data
US 2014/0161560 A1 Jun. 12, 2014

Related U.S. Application Data

(60) Provisional application No. 61/538,685, filed on Sep. 23, 2011, provisional application No. 61/514,852, filed on Aug. 3, 2011.

(51) Int. Cl.
*F16B 39/36* (2006.01)
*F16B 37/00* (2006.01)
(Continued)

(52) U.S. Cl.
CPC .......... *F16B 37/002* (2013.01); *B23G 9/009* (2013.01); *F16B 37/0864* (2013.01); *F16B 39/38* (2013.01)

(58) Field of Classification Search
CPC ......... F16B 37/002; F16B 39/38; B23G 9/009
(Continued)

(56) References Cited

U.S. PATENT DOCUMENTS 3,151,653 A * 10/1964 Zahodfakin ........... F16B 5/0208
411/267
4,083,393 A * 4/1978 Okada ................. F16B 37/0857
411/267
(Continued)

FOREIGN PATENT DOCUMENTS

DE 9410554 U1 11/1994
DE 102009039822 A1 3/2011
(Continued)

OTHER PUBLICATIONS

European Patent Office, Extended European Search Report Issued in European Patent Application No. 12819507.0, Mar. 9, 2015, Germany, 6 pages.
(Continued)

*Primary Examiner* — Gary Estremsky
(74) *Attorney, Agent, or Firm* — McCoy Russell LLP

(57) ABSTRACT

A fastener system is provided. The fastener system includes a pair of nuts having a beveled end and opposed flats, a nut housing having a cavity, the cavity including an end wall with an aperture and a tapered interior portion to engage the beveled end, and opposing internal flats to engage the nut flats, a resilient member to urge the beveled ends against the tapered portion; and retaining element. The nuts may include tapered thread edges to accommodate damaged male threads, or cutting thread edges to repair damaged male threads.

17 Claims, 47 Drawing Sheets

(51) Int. Cl.
*F16B 37/08* (2006.01)
*F16B 39/38* (2006.01)
*B23G 9/00* (2006.01)

(58) Field of Classification Search
USPC .......................................... 411/267, 432–434
See application file for complete search history.

(56) References Cited

U.S. PATENT DOCUMENTS

| | | | |
|---|---|---|---|
| 4,462,731 A | | 7/1984 | Rovinsky et al. |
| 4,572,032 A | * | 2/1986 | Kinzler ................. B23G 5/083 408/221 |
| 4,974,888 A | * | 12/1990 | Childers ............. F16B 37/0857 292/251 |
| 5,081,811 A | * | 1/1992 | Sasaki ..................... F16B 39/36 411/433 |
| 5,106,251 A | * | 4/1992 | Steinbach ............. F16B 37/085 292/251 |
| 5,288,181 A | | 2/1994 | Pinkston |
| 5,378,100 A | * | 1/1995 | Fullerton ............ F16B 37/0857 411/267 |
| 5,800,108 A | * | 9/1998 | Cabahug ............. F16B 37/0857 285/34 |
| 7,198,236 B2 | * | 4/2007 | Warner ................... F16B 7/149 248/125.8 |
| 8,328,482 B2 | * | 12/2012 | Britton ................... B25B 29/02 254/29 R |
| 2008/0014049 A1 | | 1/2008 | Dvorak |

FOREIGN PATENT DOCUMENTS

| | | |
|---|---|---|
| JP | 2002-106535 A | 4/2002 |
| JP | 2002-168222 A | 6/2002 |

OTHER PUBLICATIONS

Korean Intellectual Property Office, International Search Report of PCT/US2012/049473, Dec. 12, 2012, WIPO, 2 pages.

* cited by examiner

SPLIT NUT COMPRESSION FASTENER SYSTEM

CROSS REFERENCE TO RELATED APPLICATIONS

The present application is the U.S. National Phase of International PCT Application Serial No. PCT/US2012/049473, entitled "Split Nut Compression Fastener System," filed Aug. 3, 2012, which claims priority to U.S. Provisional Application No. 61/514,852, filed Aug. 3, 2011, and claims priority to U.S. Provisional Application No. 61/538,685, filed Sep. 23, 2011, all of which are hereby incorporated by reference in their entirety for all purposes.

FIELD OF THE INVENTION

The present invention relates to threaded fastener systems, and particularly to building hurricane and seismic restraints and thread repair devices.

BACKGROUND

The split nut compression fastener system is useful for easy application along with the ability to self-tighten as moisture content changes in wood, and to provide positive resistance against loosening caused by vibrations, flexing or seismic events. Although application in wood structures was the motivation for designing the fastener system the design has led to the realization that the system has a much wider range of applications. The fastener system can be scaled to fit any sized bolt or threaded rod simply by increasing the size of the exterior housing and interior lock threads. The fastener system has also been designed to where the user will not need to carry multiple wrenches or sockets for tightening. One size wrench or socket will be able to tighten multiple sizes of bolts before the exterior housing will adjust up to the next housing size. The steel version of the fastener system will hold against 50,000 lbf.

In the construction world there are many times during the work week when bolts or threaded rods are damaged during every day mishaps. This causes loss of time when hired employees go to install an average nut to damaged threads on a bolt or threaded rod. When threads get damaged, the employee will need to replace or repair the threaded surface before a nut can be applied. This results in higher a cost of construction.

Discovery of damaged threads on a threaded rod or bolt typically requires replacement for the rod. This sounds easy enough except when jobs are supplied with just the right amount of nuts and bolts for the job at hand. The result is the need for the employer or employee to travel to the nearest supply store to purchase a new bolt. Many bolts on construction sites are not in areas where they can be easily accessed from the ground. In fact, many bolts on construction sites are applied in high, off-the-ground setting, where the employees are in a man lift, using safety ropes and harnesses, or on a ladder. Additionally, many are actually threaded rods that may have been embedded in or under other components already, and therefore very difficult to replace. Damaged threads in these situations require the employee to get to the ground, retrieve another bolt, and return to the area to apply the new bolt. The other alternative is to try and use the damaged bolt which often will lead to cross threading. Tightening a cross threaded bolt results in a weak connection and a weakening of the structural connection. Weak connections equal a weak structure.

The fastener system can be used on every bolt to speed up installation or just on damaged bolts as needed. The fastener system can be slid over and by all damaged treads on a bolt, allowing installers avoid costly delays and frustrations. Most building procedures that require bolts also require heavy equipment to install the components that need to be bolted together. The fastener system installation will save time for the connection installer that will result in less costly equipment and equipment operator time.

Threaded rods are used to hold buildings to foundation, floor-to-floor connections, roof-to-building connections, and in retrofit remodel construction. When retrofitting or remodeling an existing building, extra connections are needed by adding threaded rod to existing foundations or side wall. Like bolts, some of the threaded rods get damaged and require extra time to repair. This involves getting tools to cut or grind on the threaded rod to repair the treads so that the nut can be applied. Threaded rods that are not repaired will also result in cross threading, which leads to weak connections.

The fastener system can be manufacture to fit any sized threaded surface. The fastener system in wood construction, where moisture content of materials may result in shrinking, may be used with a hold down or saddle. The fastener system application on wood structures will allow the nuts to self-tighten on bolts or threaded rods as the building materials shrink. The fastener system allows connections on wood to stay tight as the connection hardware was engineered to do. The fastener system in non-shrinking material is designed to be installed directly to raw surfaces and tightened.

Lumber may shrink significantly after construction installation. For example, a "2-by-10" board may be delivered to the job site at its nominal 9½ inch width by 1 9/16 inch thickness, but six months after installation it may be only 9¼ inches wide and 1 7/16 inches thick. Similarly, a "2-by-4" may be delivered to a job site at its nominal 1 9/16 inch thickness, but after six months it may have shrunk to 1 7/16 inches thick. While this can be problematic in any construction setting and must be accounted for, it creates special difficulties for installing seismic restraints and hurricane restraints, where significant shrinkage over time may render the bolted hold downs loose and ineffective. In other words, although conventional hold down systems may prevent a nut from backing off a threaded rod, they will not maintain the nut tight against the wood members as they shrink.

A number of devices have provided split nut capability, but lack the interchangeability, torque-taking ability, automatic tightening and damaged bolt capabilities of the present invention. Presently known art attempts to address this problem, but has not completely solved the problem.

SUMMARY AND ADVANTAGES

A split nut compression fastener system includes a pair of half nuts having at least one beveled end and opposed external flats; a nut housing having a cavity to receive the half nuts, the cavity including an end wall with an aperture to receive a threaded rod and a tapered interior portion to engage a half nut, and opposing internal flats to engage the half nut external flats; a resilient member to urge the half nut beveled ends against the nut housing tapered portion; and retaining element to retain the components within the nut housing. The half nuts may include tapered thread edges to accommodate damaged male threads, or cutting thread edges to repair damaged male threads. The system may include a pair of stacked nut assemblies with an interlineal compression member disposed between them. The system may include a nut assembly in combination with a vertical hold down. The system includes multiple sets of half nuts for different thread sizes which may be interchanged within a common nut housing. The system may include each half nut having a plurality of thread portions, each thread portion having a thread cutting edge. The system may include each half nut including a second end wall displaced inwardly from the first end wall to form a projecting shoulder, a third flat, and a corresponding recess in the projecting interior flat to engage the projecting shoulder.

The fastener system of the present invention presents numerous advantages, including: (1) immunity to damaged threads; (2) flexibility to accommodate many thread sizes within a common sized nut housing; (3) interchangeability of half nut components; (4) long term stability and operation in spite of dimensional changes to the structure members; (5) self-tightening ability; (6) simplicity and labor savings; (7) flexibility of materials and manufacturing methods; (8) the ability to handle high torque loads; and, (9) the ability to repair damaged threads on installed threaded members.

Additional advantages of the invention will be set forth in part in the description which follows, and in part will be obvious from the description, or may be learned by practice of the invention. The advantages of the invention may be realized and attained by means of the instrumentalities and combinations particularly pointed out in the appended claims. Further benefits and advantages of the embodiments of the invention will become apparent from consideration of the following detailed description given with reference to the accompanying drawings, which specify and show preferred embodiments of the present invention.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

DETAILED DESCRIPTION

Figure 1:
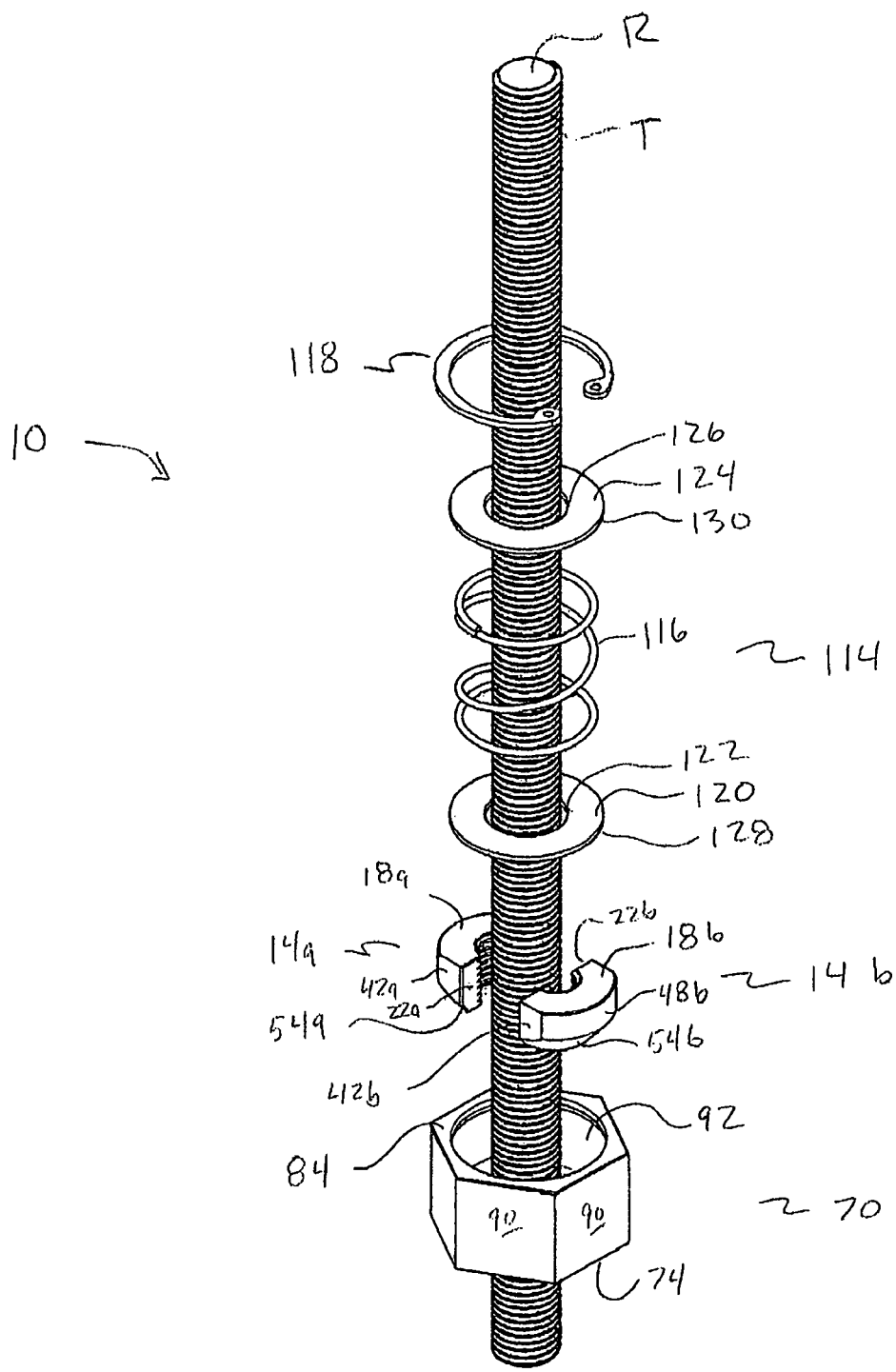
FIG. 1 shows an exploded view of a first embodiment.
Figure 2:
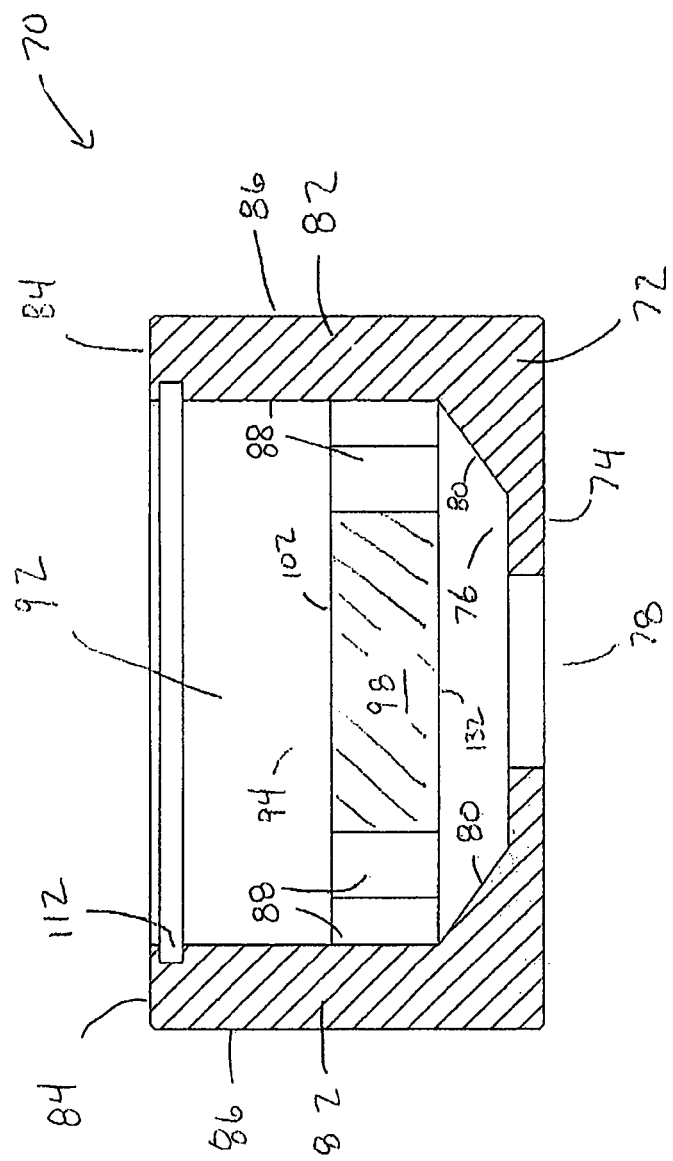
FIG. 2 shows a cutaway side view of a nut housing of a first embodiment, from the internal flat.
Figure 3:
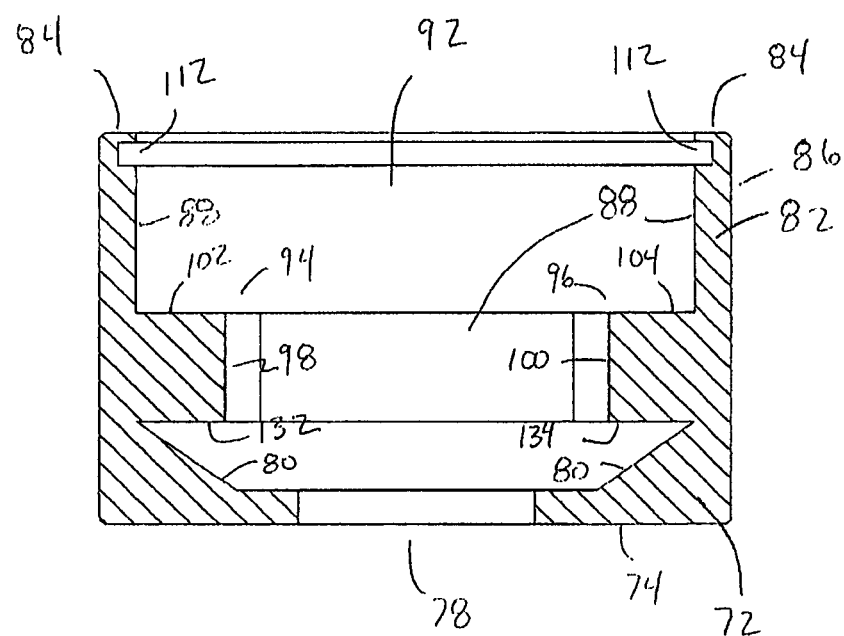
FIG. 3 shows a cutaway side view of a nut housing of a first embodiment, from the slot end.
Figure 4:
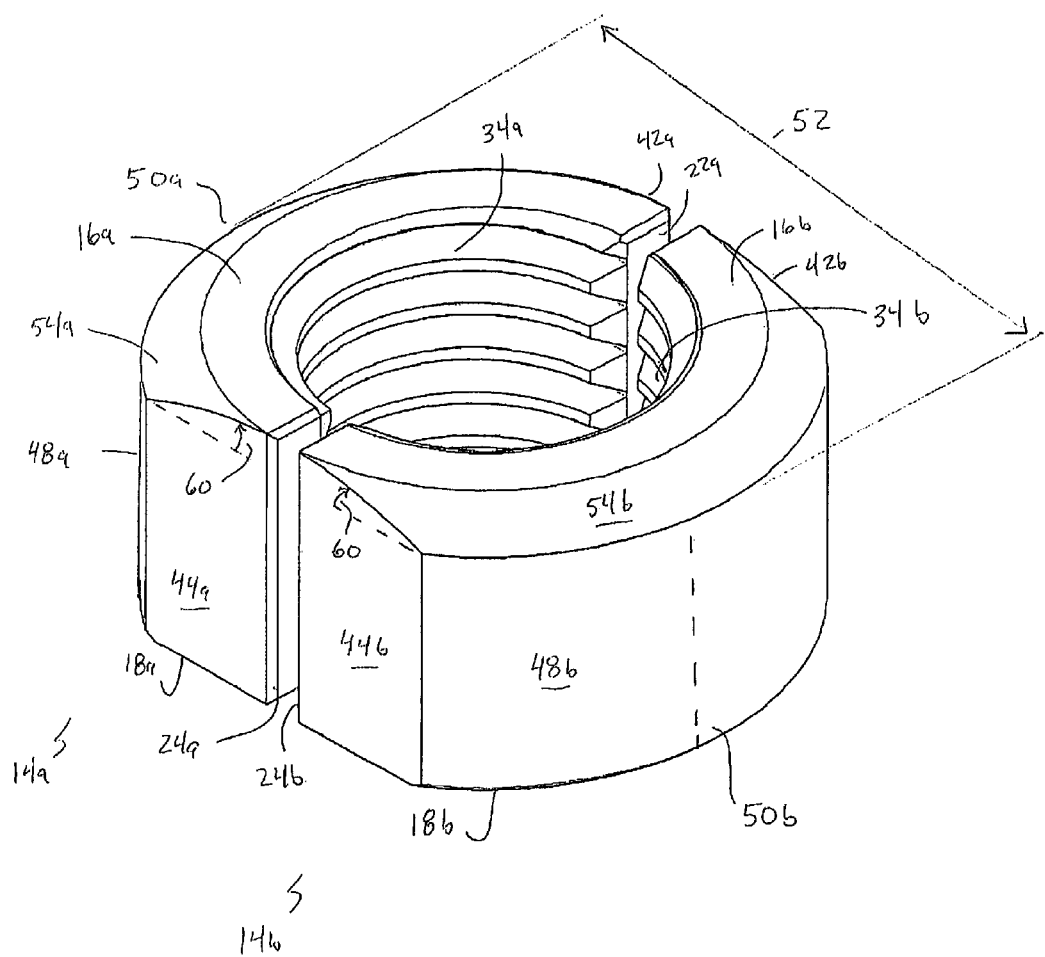
FIG. 4 shows a perspective view of a pair of half nuts of a first embodiment.
Figure 5:
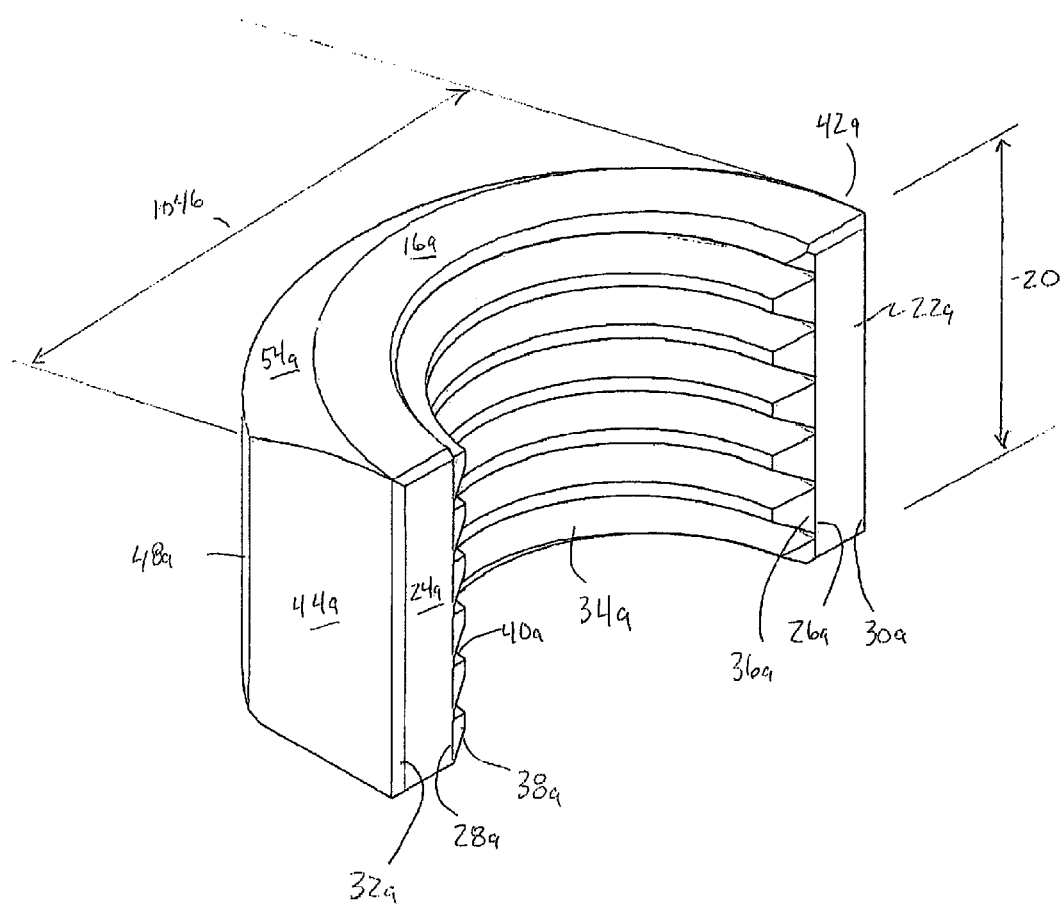
FIG. 5 shows a perspective view of a half nut of a first embodiment.
Figure 6:
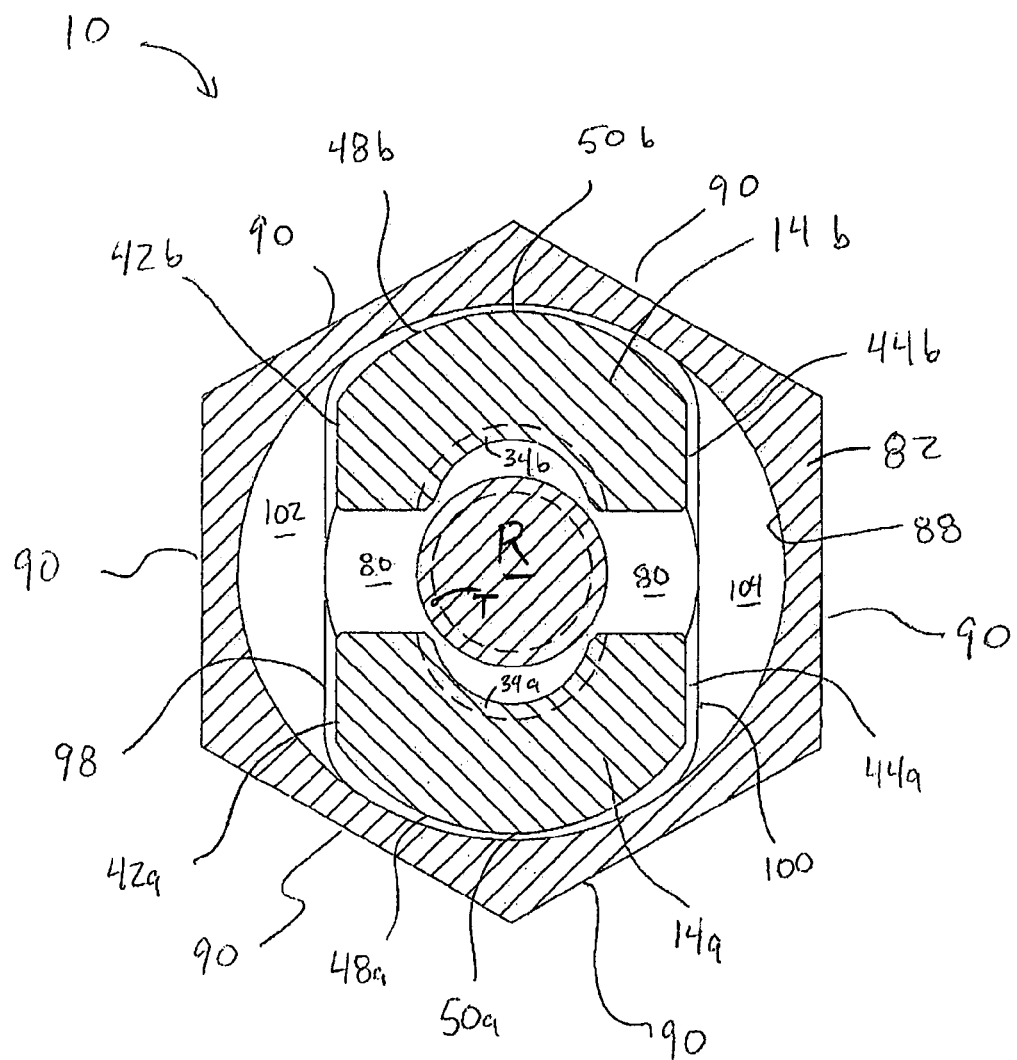
FIG. 6 shows a cutaway view of a first embodiment nut assembly on a threaded rod, disengaged.

Before beginning a detailed description of the subject invention, mention of the following is in order. When appropriate, like reference materials and characters are used to designate identical, corresponding, or similar components in differing figure drawings. The figure drawings associated with this disclosure typically are not drawn with dimensional accuracy to scale, i.e., such drawings have been drafted with a focus on clarity of viewing and understanding rather than dimensional accuracy.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Referring to FIGS. 1-6, a first embodiment of a fastener system 10 is shown. A first embodiment 10 includes a first nut assembly 12 to couple to a male threaded rod R, the first nut assembly 12 including opposed first and second half nuts 14a and 14b, a nut housing 70 to receive the first and second half nuts 14a & b, a compression portion 114, and retaining element 118.

Still referring to FIGS. 1-5, in a first embodiment, each first and second half nut 14a, 14b includes opposed first and second axial ends 16a, 16b and 18a, 18b, the distance between the axial ends 16a and 18a, 16b and 18b defining the nut depth 20a, 20b, respectively. First and second end faces 22a, 22b and 24a, 24b extend from the respective interior edge 26a, 26b, 28a, 28b to an exterior edge 30a, 30b and 32a, 32b, respectively, and from the first axial end 16a, 16b to the second axial end 18a, 18b, and parallel to each other. Female threaded semicircular interior surface 34a, 34b is adapted to engage a selected male thread T, the threaded interior surface 34a, 34b extending from a first thread edge 36a, 36b proximate the first end face interior edge 26a, 26b to a second thread edge 38a, 38b proximate the second end face interior edge 28a, 28b, and from the first 16a, 16b to the second 18a, 18b axial end, and having a thread depth 40a, 40b. Opposed parallel first and second exterior flats 42a, 42b and 44a, 44b are proximate the respective first and second end face exterior edges 22a, 22b and 24a, 24b, with the distance between the first and second exterior flats defining the nut width 46a, 46b. Back wall 48a, 48b extends between the first and second flats 42a, 42b and 44a, 44b, and between the first and second axial ends 16a, 16b and 18a, 18b. The maximum distance between opposed points 50a, 50b on the respective first and second half nut back walls 48a, 48b when the first and second half nuts 14a, 14b are fully engaged against a threaded rod R defines the nut breadth 52. First bevel surface 54a, 54b extends along the intersection 56a, 56b of the back wall 48a, 48b and the first axial end 16a, 16b, defines a half nut first beveled end 58a, 58b and has a first bevel angle 60a, 60b. When the first and second half nuts 14a, 14b enclose a threaded rod R having the selected male thread T the respective first and second end faces 22a, 22b and 24a, 24b of the first and second half nuts 14a, 14b do not contact each other. This ensures that they will not interfere with the compression exerted on the half nuts. In the embodiment, each of first and second half nut first and second thread edges 36a, 36b and 38a, 38b, respectively, is beveled extending from the first axial end 16a, 16b, to the second axial end 18a, 18b, respectively. Beveling the thread edges, combined with the separation between end faces 22a, 22b and 24a, 24b, respectively, and the loose engagement—if any—of female threads 34a, 34b against threaded rod R while inserting, allows the nut assembly 12 to bypass regions of damaged threads—a common occurrence in construction projects that can cause significant delays while effecting repairs. Alternatively, first and second thread edges 36a, 36b and 38a, 38b may be rounded.

Still referring to FIGS. 1-6, in the first embodiment 10 nut housing 70 includes an end wall 72 having opposed exterior and interior surfaces 74 and 76 and a center aperture 78, the end wall interior surface including a concave tapered portion 80 centered on the center aperture 78 and matching the first bevel angle 60 to receive a half nut beveled end 58a, 58b. End wall exterior surface 74 has a flat face. Enclosing sidewalls 82 extending from the end wall 72 to an edge face 84 and have exterior and interior surfaces 86 and 88, respectively, the edge face 84 parallel to the end wall exterior face 74. Side wall exterior surfaces 86 are adapted to receive a torque device. In the embodiment, side wall exterior surfaces 86 include six hexagonal flats 90 to receive a conventional flat wrench, but other configurations could be used, for example a square nut, star nut or other configurations. The interior surfaces of the end wall 76 and sidewalls 88 define a cavity 92 to receive first and second half nuts 14a, 14b, respectively. Opposed first and second interior flats 94 and 96, respectively, project into the cavity 92 proximate the end wall tapered portion 80, each of the first and second interior flats 94 and 96 including an engagement surface 98, 100, respectively, and a first lip 102, 104, respectively, distal from the nut housing end wall interior surface 76. The distance between the engagement surfaces defines a slot width 106 not less than the nut width 46a, 46b so as to slidingly engage the half nut exterior flats 42a, 44a and 42b, 44b, respectively, and the maximum distance 108 from the end wall interior surface 76 to the first shoulder surface 102 or 104 is less than the nut depth 20a, 20b. The distance between sidewall interior surfaces 88 across the cavity 92 in the axis parallel to the interior flats 94, 96 defines a slot length 110 greater than the nut breadth 52 by at least the nut thread depth 40a, 40b. This allows the half nuts to fully disengage from threaded rod R during downward movement. In the embodiment, side wall interior surface 86 includes a channel 112 circumscribing the surface proximate edge face 84, the channel 112 to receive a snap ring 116.

In the embodiment, bevel edge 60a & 60b and tapered portion 80 have a slope in the range 10-15 degrees, and preferably approximately 10 degrees.

In practice, nut width 46a & 46b will be slightly less than the slot width 106 to permit insertion into the nut housing.

Referring again to FIGS. 1-6, in the first embodiment compression portion 114 includes a resilient member 116 disposed within the nut housing cavity 92 to urge the first and second half nuts 14a, 14b, respectively, against the end wall interior surface 76. Retaining element 118 retains the resilient member 116 within the nut housing cavity 92. In the first embodiment, resilient member 116 is a helical spring, and retaining element 118 is snap ring insertable into channel 112 in combination with second plate 124.

Referring again to FIGS. 1-6, in the first embodiment compression portion 114 includes a first plate 120 having a center aperture 122 and movably disposed between the resilient member 116 and the first and second half nuts 14a & 14b, respectively, and a second plate 124 having a center aperture 126 and movably disposed between the resilient member 116 (in the embodiment, a helical spring) and the retaining element 118. First plate 120 provides more equal distribution of pressure from spring 116 against first and second half nuts 14a, 14b to ensure they remain aligned with each other and against tapered portion 80. In the embodiment, the outer perimeter edges 128 and 130 of first and second plates 120 and 124, respectively, approximately match the cross section of cavity 92 and side wall interior surfaces 86, so that they slide alongside wall interior surfaces 86 without becoming cockeyed. Resilient member 116 could also act directly against half nuts 14a & 14b without first plate 120, in which case the nut depth 20a, 20b would not necessarily have to be greater than the distance 108 from the end wall interior surface 76 to first shoulder surface 102, 104, and still be within the scope of the invention. In the embodiment, first plate 120 provides simple and robust distribution means and bearing surface to isolate the sliding movement of half nuts 14a & 14b from resilient member 116.

In the first embodiment, each of first and second half nut back walls 48a & 48b have an arcuate cross section, and more specifically a partial circular cross section, and nut housing end wall interior surface tapered portion 80 forms a concave frustum centered on aperture 78. Each of the nut housing first and second interior flats 94 and 96 include an opposed second lip 132 and 134, respectively, proximate the end wall interior surface 76, such that the interior flats 94 and 96 partially overhang the nut housing end wall interior tapered portion 80.

The arcuate cross section and frustum arrangement provide for more even compression around the perimeter of first and second half nut first beveled ends 58a & 58b, respectively, from tapered portion 80, which is especially useful for high torque scenarios. Additionally, a non-circular cross section for beveled ends 58a & 58b, and tapered portion 80, creates a complex surface which is difficult to machine with precision. In the first embodiment, the Inventor produced a nut housing 70 in a multi-step machining process in order to achieve a circular frustum cross section: first, machining out cavity 92; second machining the tapered frustum 80; third machining channel 112, and fourth spot welding interior flats 94 and 96 to side wall interior surface 88.

Alternatively, first and second half nut back walls may be substantially rectangular in cross section, such that the first beveled surfaces would comprise essentially triangular wedges, with end wall interior surface tapered portion formed into corresponding opposed flat tapered surfaces. However, this flat tapered configuration is very difficult to obtain using machining techniques (in fact requiring special tooling), so would generally be limited to plastic molding (which would limit the strength and temperature properties of the system) or powdered metal forming techniques (which can be relatively expensive). Additionally, the rectangular wedge shape is more susceptible to galling or jamming, and may provide less even compression which reduces resistance to backing out. Unlike conventional bolting systems, the inventor's system may be manufactured from electrically non-conductive and/or chemically resistant materials such as PVC, PTFE, carbon fiber, or similar materials, for example to be used as a seismic restraint for a semiconductor chemical bench in a clean room, but still provide significant strength.

In the embodiment, resilient member 116 is a helical spring, but other resilient systems such as flat springs, pneumatics, or even opposing magnets could be used depending on size, cost and chemical environment, for instance. The fastener system can be easily scaled up or down for a given application.

Figure 7:
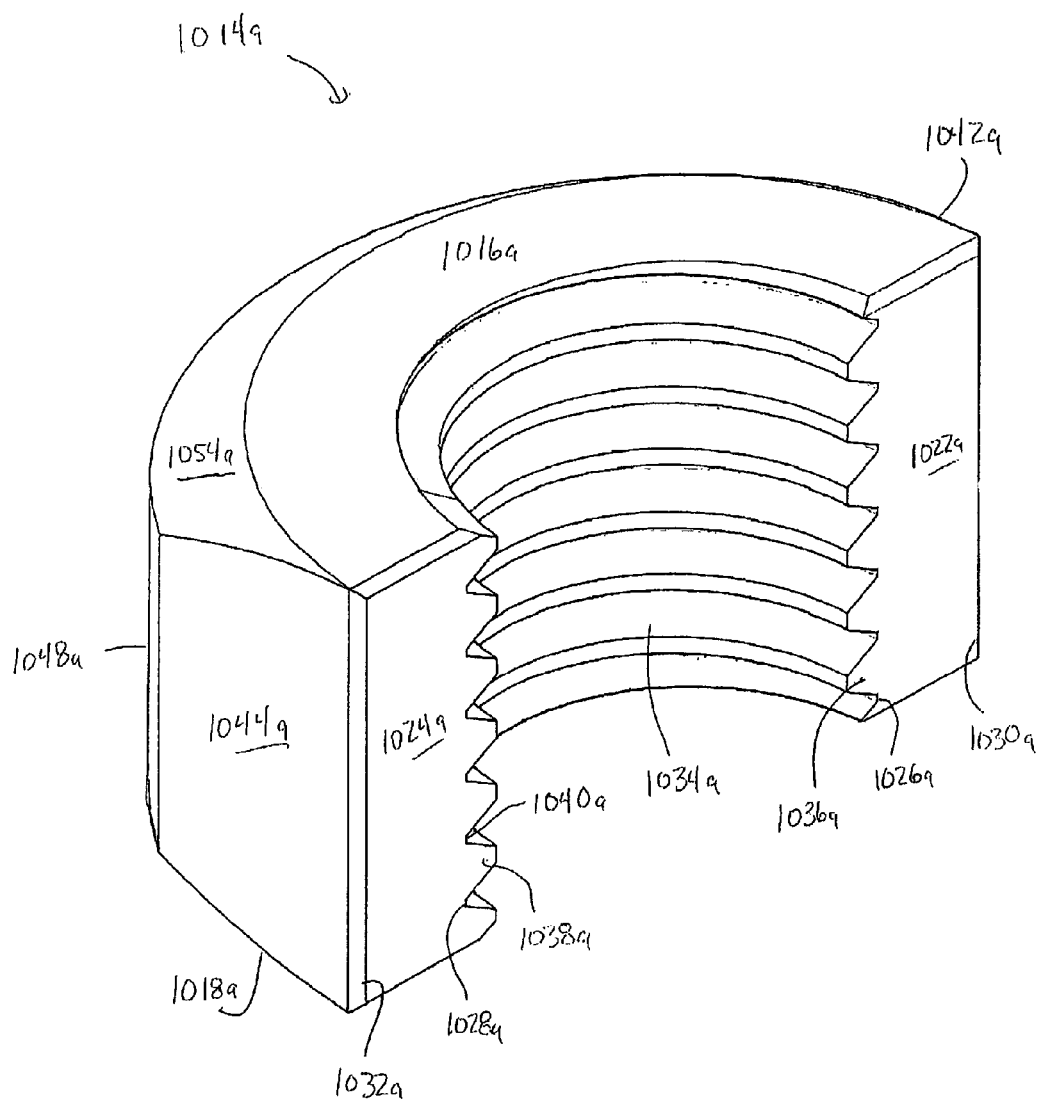
FIG. 7 shows a perspective view of a half nut of a second embodiment.
Figure 8:
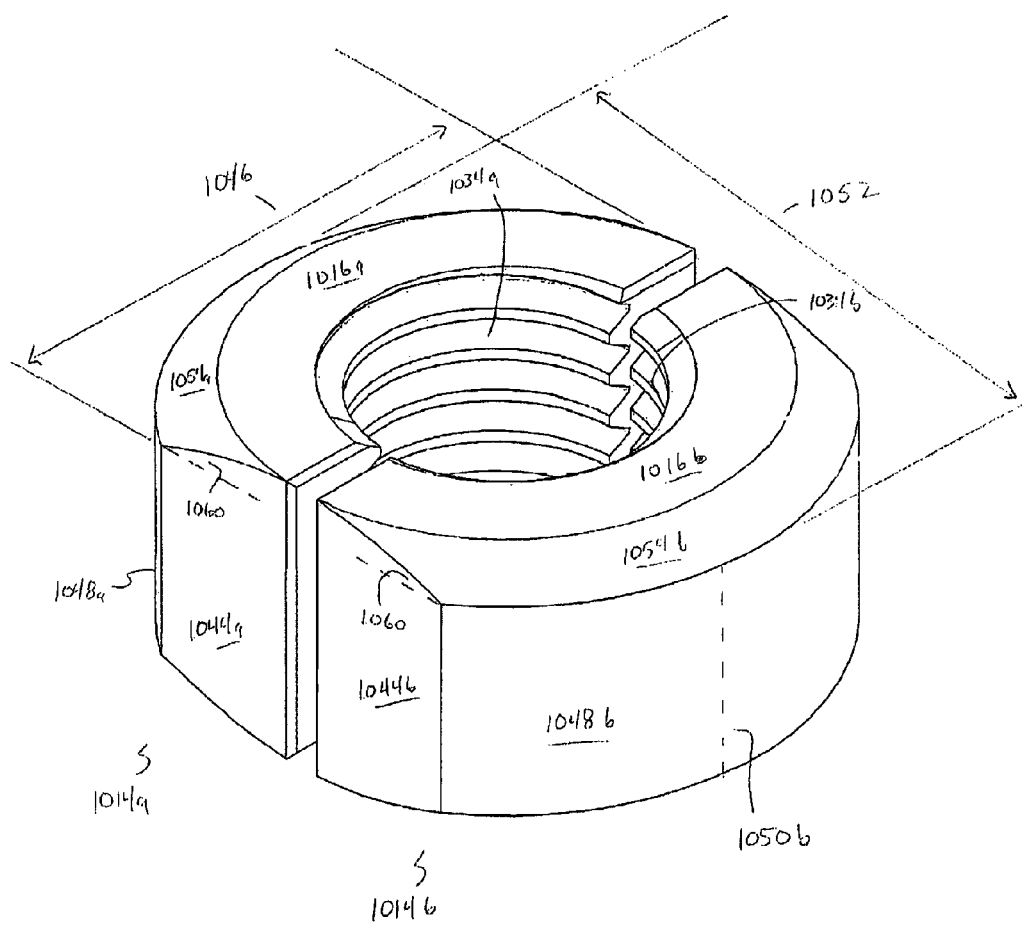
FIG. 8 shows a perspective view of a pair of half nuts of a second embodiment.
Figure 9:
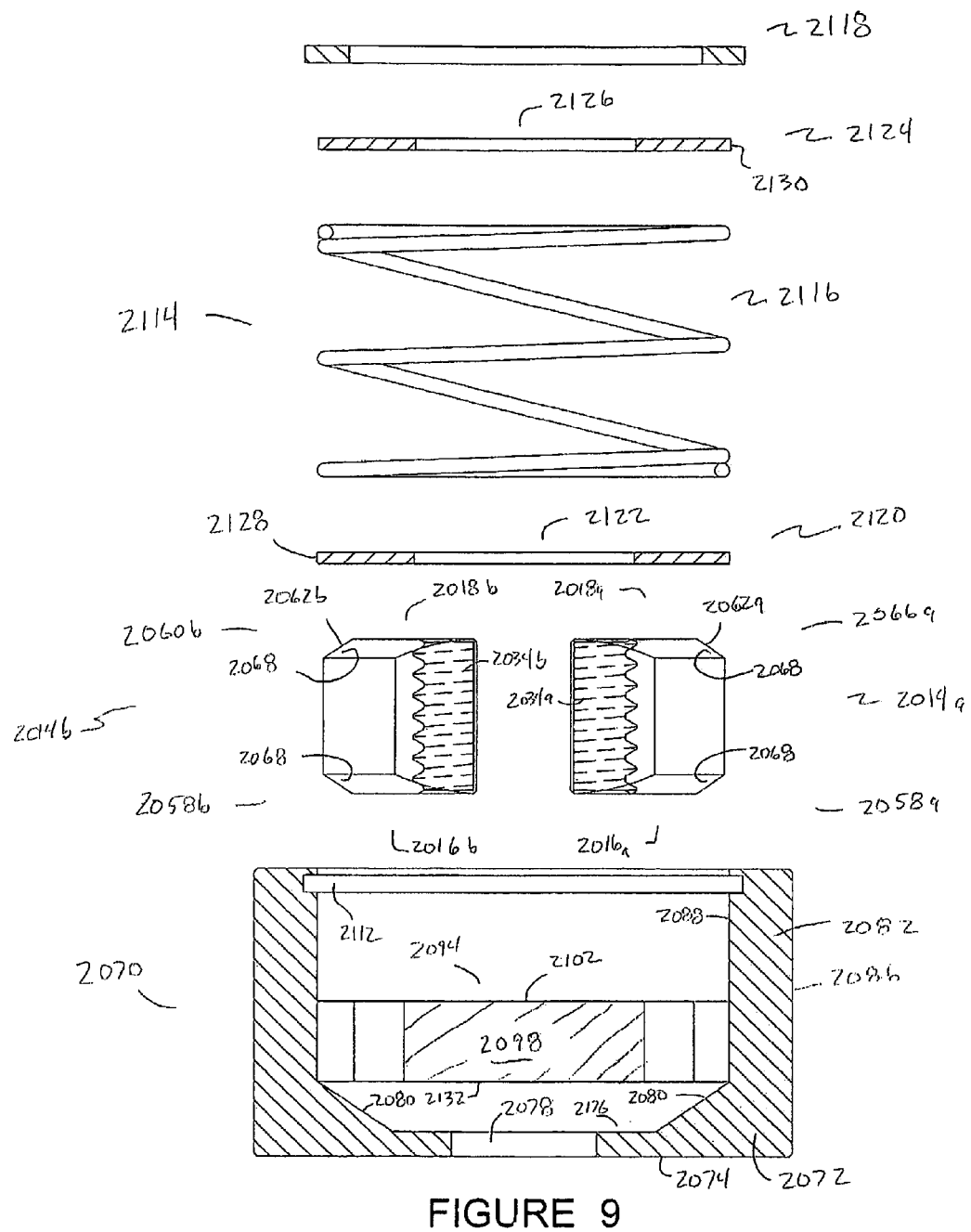
FIG. 9 shows an exploded cutaway side view of a third embodiment.
Figure 10:
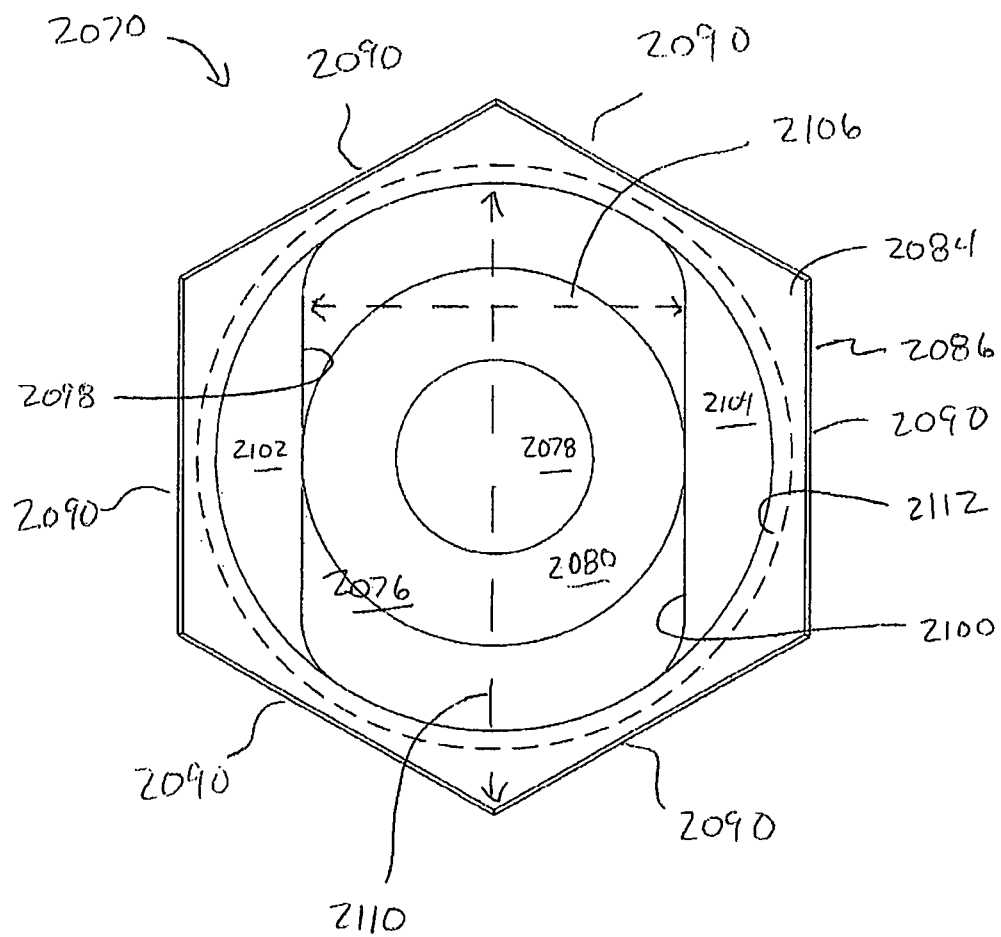
FIG. 10 shows an end-on view of a nut housing of a third embodiment.
Figure 11:
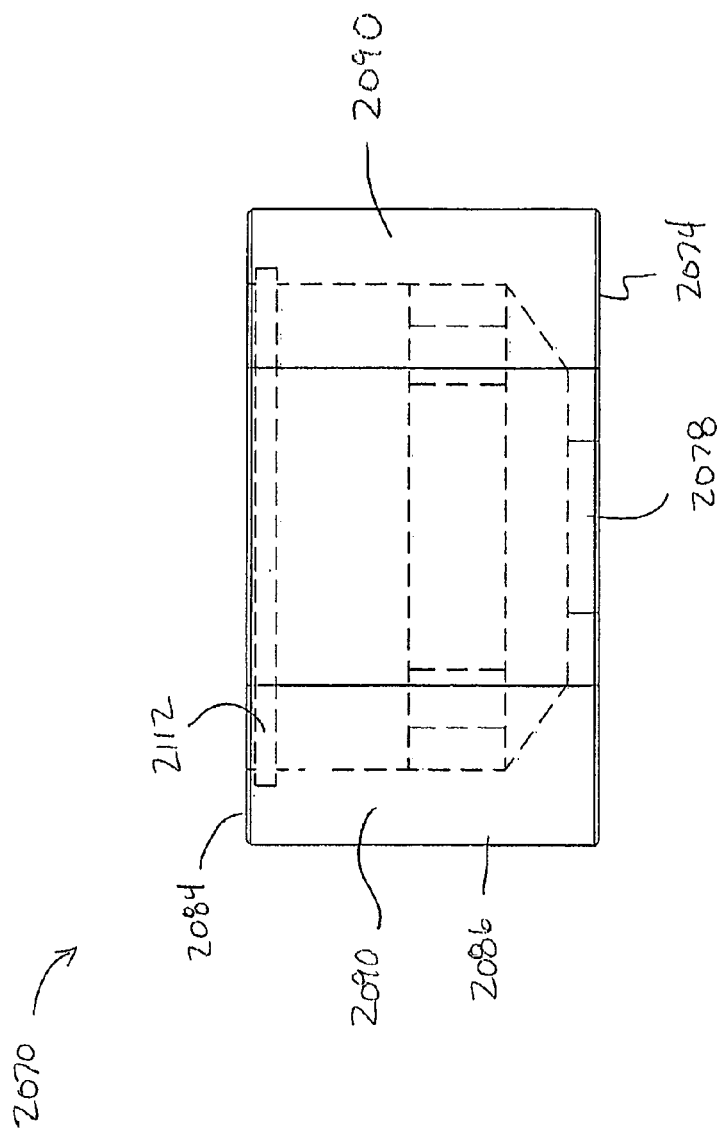
FIG. 11 shows a side view of a nut housing of a third embodiment oriented on the internal flats, with internal structures shown in hidden lines.
Figure 12:
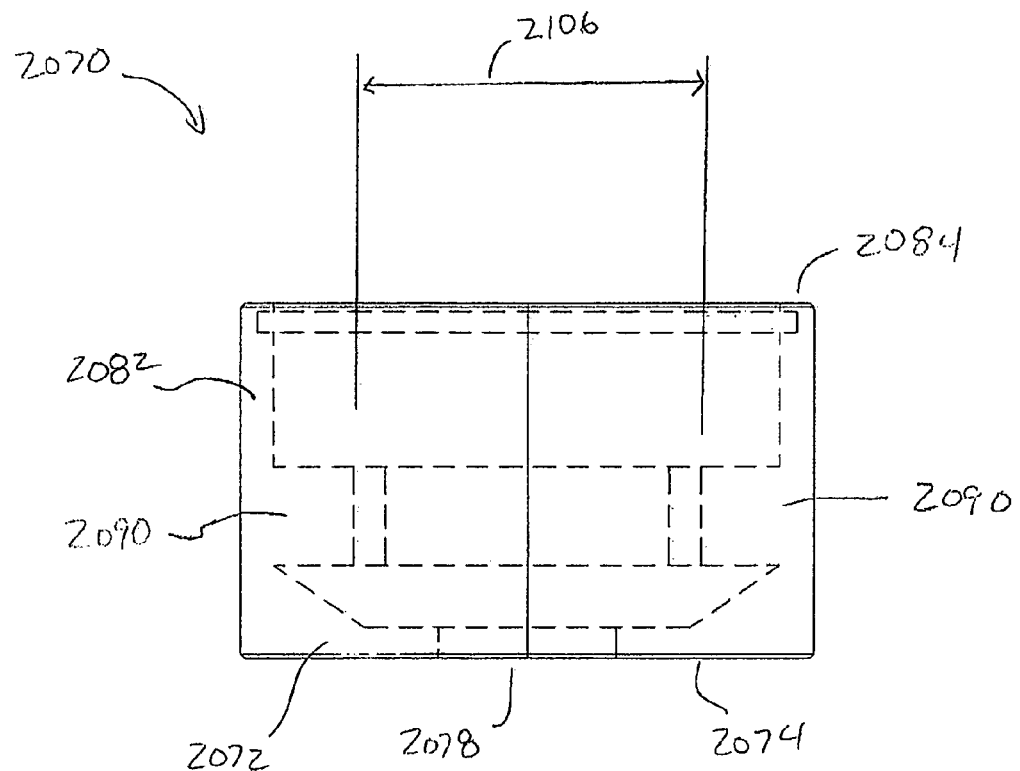
FIG. 12 shows a side view of a nut housing of a third embodiment oriented on the slot end, with internal structures shown in hidden lines.
Figure 13:
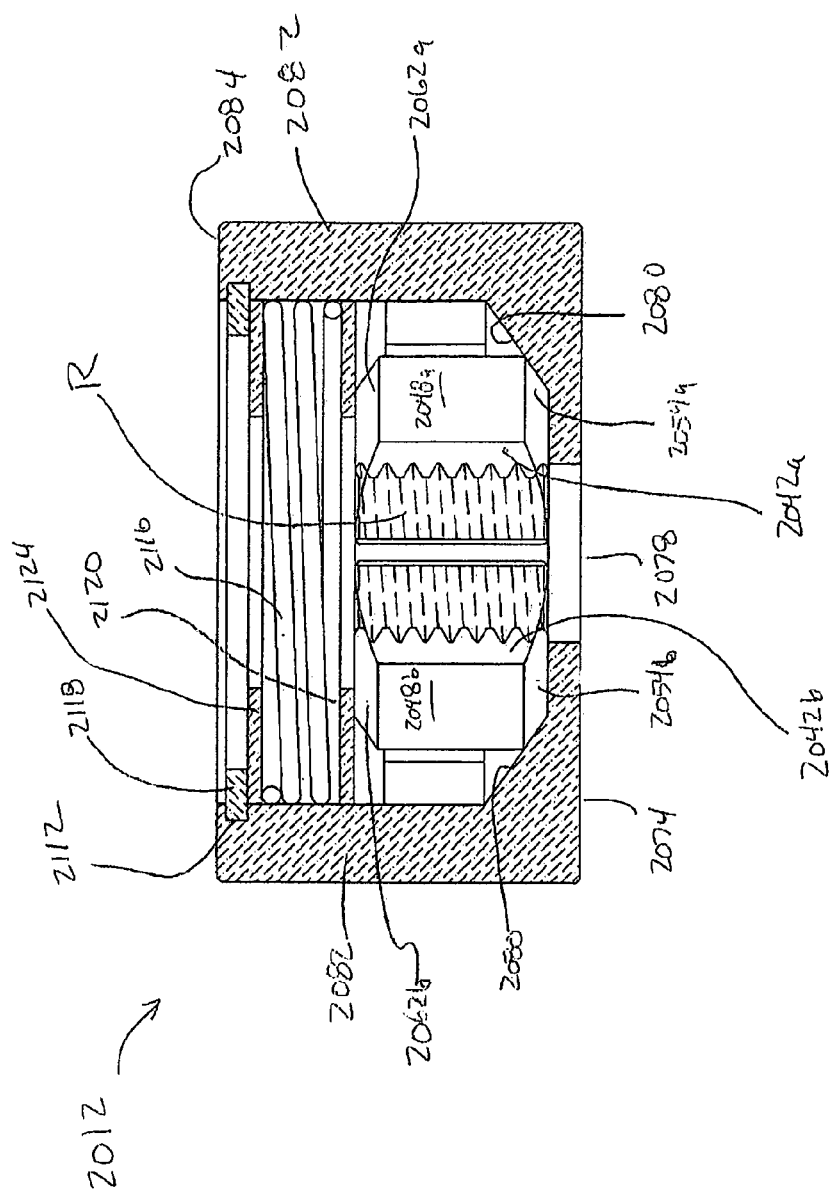
FIG. 13 shows a cutaway view of a third embodiment assembled.

Referring to FIGS. 7-8, first and second half nuts 1014a & 1014b of a second embodiment 1010 are shown. In the embodiment, each of first and second half nut first and second thread edges 1036a & 1036b and 1038a & 1038b, respectively, are sharp thread-cutting edges extending from the first axial end 1016a & 1016b, to the second axial end 1018a & 1018b, respectively. The ability to insert thread cutting half nuts 1014a & 1014b into a nut housing (not shown) provides the ability to repair damaged threads on a threaded rod if desirable, similar to a thread die cutter. Unlike a conventional thread die cutter, however, threads 1034a & 1034b would only loosely engage the male threads T along rod R until reaching the damaged thread region, at which point the user may provide counterforce on the nut housing to engage half nuts 1014a & 1014b to cut clean threads. In this way, a thread cutting die is not required to engage—and cut—the entire length of threaded rod R.

Referring to FIGS. 9-15, a third embodiment of a fastener system 2010 is shown. A third embodiment 2010 includes a first nut assembly 2012 to couple to a male threaded rod R, the first nut assembly 2012 including opposed first and second half nuts 2014a and 2014b, a nut housing 2070 to receive the first and second half nuts, a compression portion 2114, and retaining element 2118. In the third embodiment each half nut 2014a and 2014b includes opposed first and second beveled ends 2058a & 2066a and 2058b & 2066b, respectively. Providing first and second bevel surfaces allows the first and second half nuts 2014a and 2014b to be interchangeable with each other, reducing costs and potential installation errors.

Still referring to FIGS. 9-15, in a third embodiment first and second half nut bevel ends 2058a & 2058b and 2066a & 2066b, respectively, are provided. Each first and second half nut 2014a & 2014b includes opposed first and second axial ends 2016a and 2018a, the distance between the axial ends 2016a and 2018a defining the nut depth 2020a. Each of the first and second end faces 2022a, 2024a extend from respective interior edge 2026a, 2028a to an exterior edge 2030a, 2032a, and from the first axial end 2016a to the second axial end 2018a, and parallel to each other. Female threaded semicircular interior surface 2034a is adapted to engage a selected male thread T, the threaded interior surface 2034a extending from a first thread edge 2036a proximate the first end face interior edge 2026a to a second thread edge 2038a proximate the second end face interior edge 2028a, and from the first 2016a to the second 2018a axial end, and having a thread depth 2040a. Opposed parallel first and second exterior flats 2042a and 2044a are provided proximate the respective first and second end face exterior edges 2022a and 2024a, the distance between the first and second exterior flats defining the nut width 2046a. Back wall 2048a extends between the first and second flats 2042a, 2044a and between the first and second axial ends 2016a, 2018a. The maximum distance between opposed points 2050a & 2050b on the respective first and second half nut back walls 2048a & 2048b when the first and second half nuts 2014a & 2014b are fully engaged against a threaded rod R defines the nut breadth 2052. First bevel surface 2054a extends along the intersection 2056a of the back wall 2048a and the first axial end 2016a, defining a half nut first beveled end 2058a and having a first bevel angle 2060a. Each of the first and second half nuts 2014a & 2014b includes a second bevel surface 2062a & 2062b extending along the intersection 2064a & 2064b of the back wall 2048a & 2048b and the second axial end 2018a & 2018b, respectively, defining a half nut second beveled end 2066a & 2066b, respectively, and having a second bevel angle 2068a & 2068b matching the first bevel angle 2060a & 2060b. wherein, when the first and second half nuts 2014a & 2014b enclose a threaded rod R having the selected male thread T the respective first and second end faces 2022a & 2022b and 2024a & 2024b of the first and second half nuts 2014a & 2014b do not contact each other.

In the third embodiment, each of first and second half nut first and second thread edges 2036a & 2036b and 2038a & 2038b, respectively, is beveled extending from the first axial end 2016a & 2016b, to the second axial end 2018a & 2018b, respectively. Beveling the thread edges, combined with the separation between end faces 2022a & 2022b and 2024a & 2024b, respectively, and the loose engagement—if any—of female threads 2034a & 2034b against threaded rod R while inserting, allows the nut assembly 2012 to bypass regions of damaged threads—a common occurrence in construction projects that can cause significant delays while effecting repairs. Alternatively, first and second thread edges 2036a & 2036b and 2038a & 2038b may be rounded.

Still referring to FIGS. 9-15, in a third embodiment 2010 nut housing 2070 includes an end wall 2072 having opposed exterior and interior surfaces 2074 and 2076 and a center aperture 2078, the end wall interior surface including a concave tapered portion 2080 centered on the center aperture 2078 and matching the first bevel angle 2060 to receive a half nut beveled end 2058a & 2058b. End wall exterior surface 2074 provides a flat face for mating against a flat surface. Enclosing sidewalls 2082 extend from the end wall 2072 to an edge face 2084 and have exterior and interior surfaces 2086 and 2088, respectively, the edge face 2084 parallel to the end wall exterior face 2074, and the side wall exterior surfaces 2086 adapted to receive a torque device. In the embodiment, side wall exterior surfaces 2086 include six hexagonal flats 2090 to receive a conventional flat wrench, but other configurations could be used. The interior surfaces of the end wall 2076 and sidewalls 2088 define a cavity 2092 to receive first and second half nuts 2014a & 2014b, respectively. Opposed first and second interior flats 2094 and 2096, respectively, project into the cavity 2092 proximate the end wall tapered portion 2080, each of the first and second interior flats 2094 and 2096 including an engagement surface 2098 and 2100, respectively, and a first lip 2102 and 2104, respectively, distal from the nut housing end wall interior surface 2076. The distance between the engagement surfaces defines a slot width 2106 not less than the nut width 2046a &2046b so as to slidingly engage the half nut exterior flats 2042a & 2044a and 2042b & 2044b, respectively, and the maximum distance 2108 from the end wall interior surface 2076 to the first shoulder surface 2102 or 2104 is less than the nut depth 2020a & 2020b. The distance between sidewall interior surfaces 2088 across the cavity 2092 in the axis parallel to the interior flats 2094 & 2096 defines a slot length 2110 greater than the nut breadth 2052 by at least the nut thread depth 2040a & 2040b. In the embodiment, side wall interior surface 2086 includes a channel 2112 circumscribing the surface proximate edge face 2084, the channel 2112 to receive a retaining clamp 2116.

Referring again to FIGS. 9-15, in the third embodiment compression portion 2114 includes a resilient member 2116 disposed within the nut housing cavity 2092 to urge the first and second half nuts 2014a & 2014b, respectively, against the end wall interior surface 2076, and retaining element 2118 to retain the resilient member 2116 within the nut housing cavity 2092. In the first embodiment, resilient member 2116 is a helical spring, and retaining element 2118 is "snap ring" insertable into channel 2112 in combination with second plate 2124.

Referring again to FIGS. 9-15, in a third embodiment compression portion 2114 includes a first plate 2120 having a center aperture 2122 and movably disposed between the resilient member 2116 and the first and second half nuts 2014a & 2014b, respectively, and a second plate 2124 having a center aperture 2126 and movably disposed between the resilient member 2116 and the retaining element 2118. First plate 2120 provides more equal distribution of pressure from spring 2116 against first and second half nuts 2014a & 2014b to ensure they remain aligned with each other and against tapered portion 2080. In the embodiment, the outer perimeter edges 2128 and 2130 of first and second plates 2120 and 2124, respectively, approximately match the cross section of cavity 2092 and side wall interior surfaces 2086, so that they slide alongside wall interior surfaces 2086 without becoming cockeyed.

In the third embodiment, each of first and second half nut back walls 2048a & 2048b have an arcuate cross section, and more specifically a partial circular cross section, and nut housing end wall interior surface tapered portion 2080 forms a concave frustum centered on aperture 2078. Each of the nut housing first and second interior flats 2094 and 2096 include an opposed second lip 2132 and 2134, respectively, proximate the end wall interior surface 2076, such that the interior flats 2094 and 2096 partially overhang the nut housing end wall interior tapered portion 2080.

Figure 14:
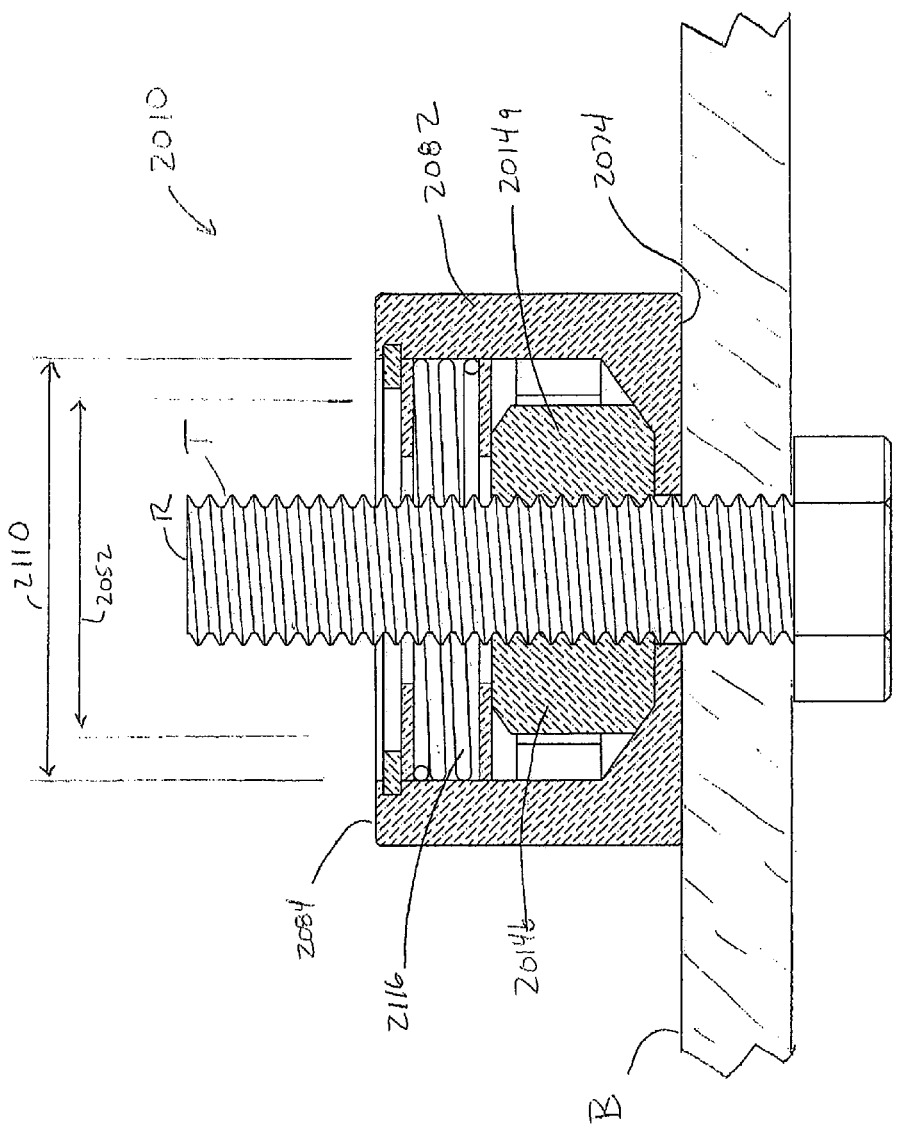
FIG. 14 shows a cutaway view of a third embodiment engaged to a threaded rod.
Figure 15:
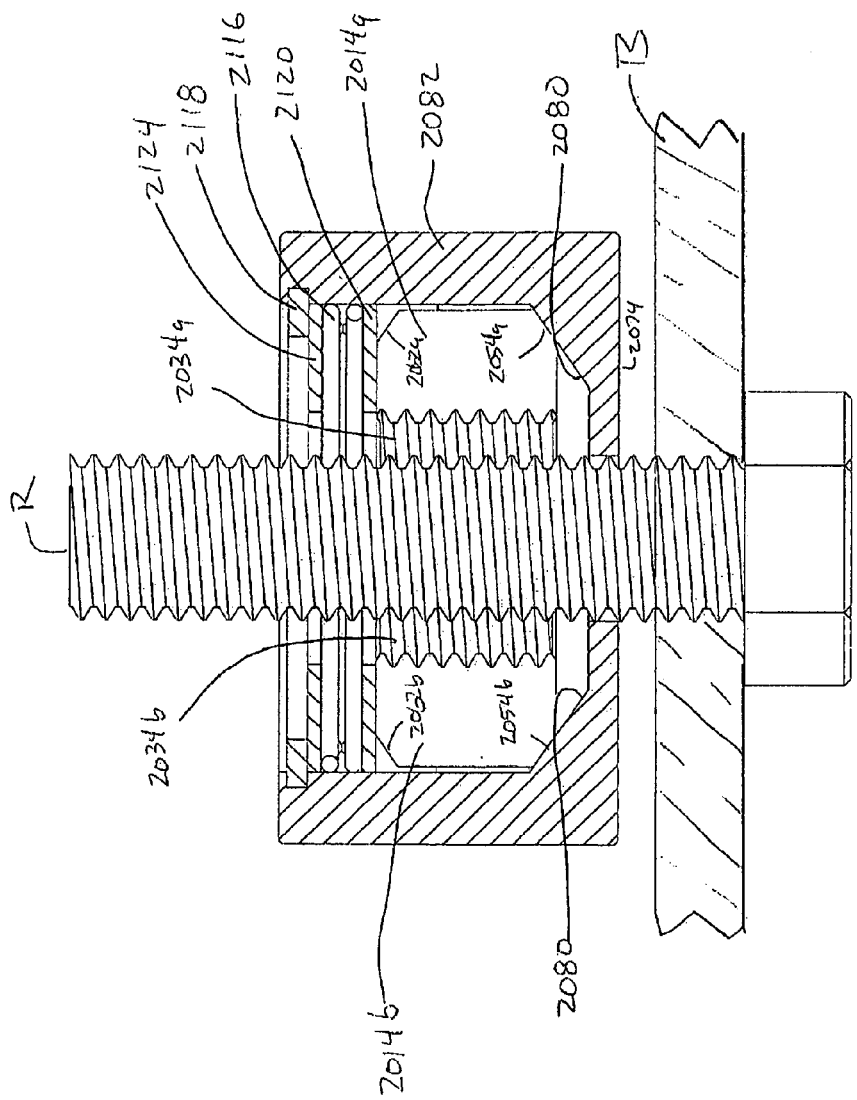
FIG. 15 shows a cutaway view of a third embodiment disengaged on a threaded rod.

Referring to FIGS. 9-15, and particularly to FIGS. 14-15, the operation of the system is demonstrated. Nut housing end wall exterior surface 2074 faces the surface to be coupled. When nut assembly 2012 is inserted over a threaded rod R, as shown in FIG. 15, half nuts 2014a & 2014b are loose within cavity 2092 and will slide apart along the slot length 2110, allowing assembly 2012 to slide down R easily. Female threads 2034 may loosely engage the male threads on rod R. Assembly 2012 is moved down rod R until it is abutting the member to be coupled, designated B, which is connected within the structure by other standard means, such as nails, screws, brackets, etc. With assembly 2012 pressed tightly against B, as shown in FIG. 14, the user may rotate nut housing 2070 slightly to ensure half nuts 2014a & 2014b slip into engagement with threaded rod R. Resilient member 2116 will press half nuts 2014a & 2014b into light engagement by pressing beveled ends 2058a & 2058b against tapered surface 2080. At this point the system 2010 is set. If an external force pushes member B upwards or pulls rod R downward (such as during high winds or a seismic event), then half nuts 2014a & 2014b will be driven inwards against threaded rod R to prevent movement, thereby preventing member B from lifting, as shown in FIG. 14. If member B shrinks over time, nut housing 2070 will slide downward, loosening the engagement of half nuts 2014a & 2014b, and resilient member 2116 will urge them down rod R. The process of shrinkage and nut movement is slow, but over time will ensure the fastener system remains effective for its purpose to prevent upward displacement of member B.

Figure 16:
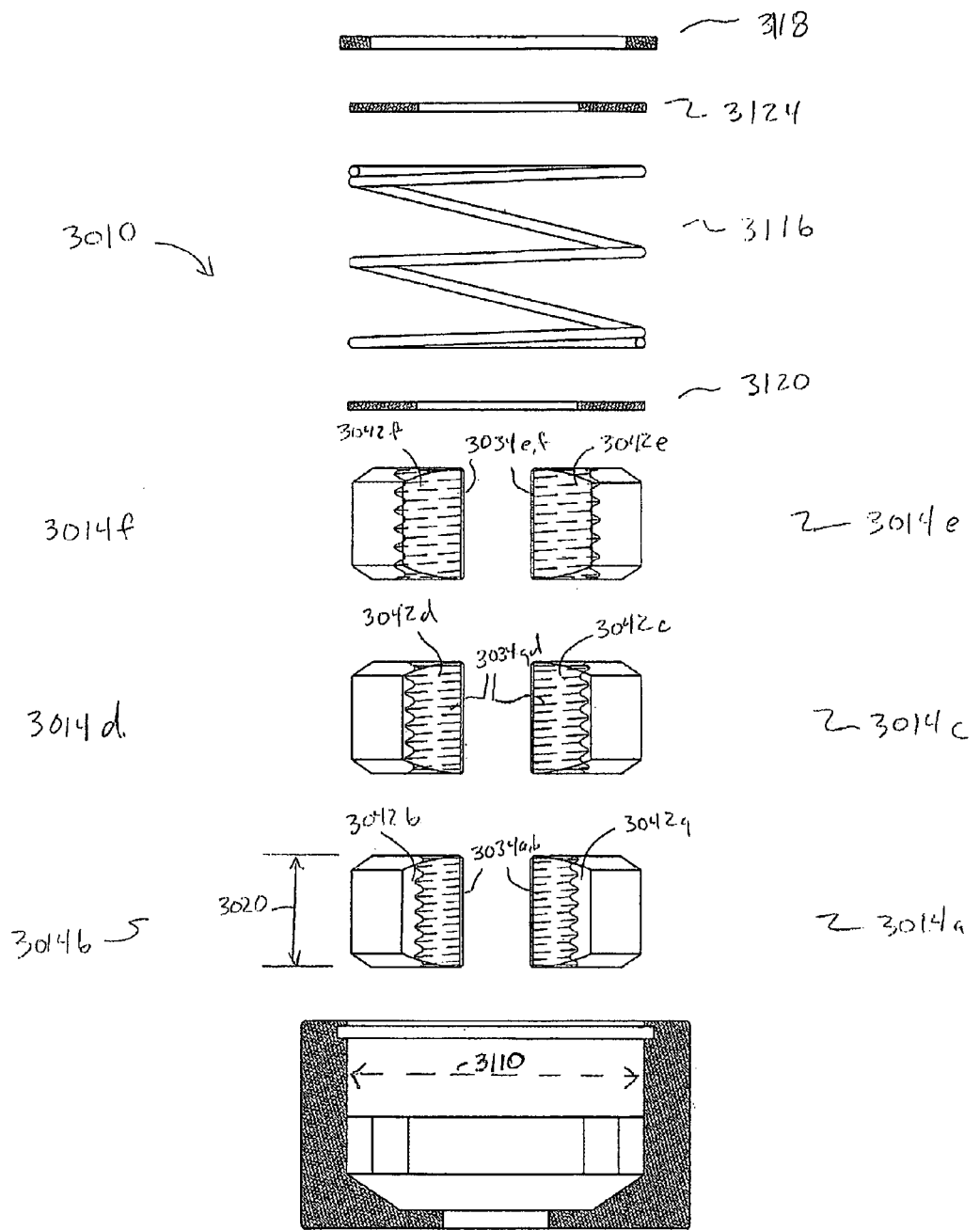
FIG. 16 shows an exploded partial cutaway side view of a fourth embodiment.
Figure 17:
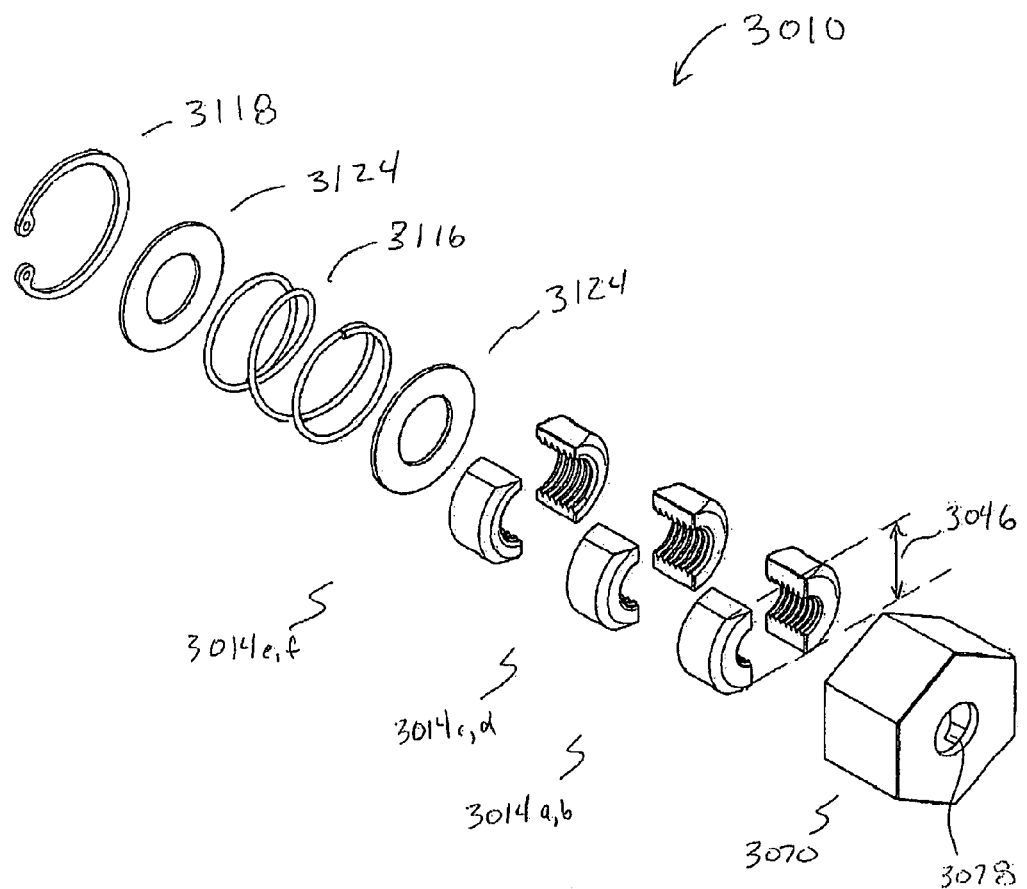
FIG. 17 shows an exploded perspective view of a fourth embodiment.

Referring to FIGS. 16-17, a fourth embodiment 3010 is shown, including a plurality of half nut sets 3014a&b, 3014c&d, and 3014e&f, each similar to the third embodiment described above. In the embodiment, each half nut set 3014ab, 3014cd & 3014ef includes a different female thread size corresponding to a selected male thread size, but all have approximately the same nut width 3046, nut breadth 3052 (half nuts shown separated, rather than engaged to a male thread), and nut depth 3020, such that nut housing 3070 is usable with any of the sets. This interchangeability of the system design provides substantial advantages in that the nut housing 3070 is significantly more expensive and heavier than the respective half nuts 3014, so relatively fewer nut housings 3070 (as well as first and second plates 3120 and 3124, resilient members 3116, and retaining element 3118) may be stocked and transported in proportion to half nut sets to support a given range of threaded rod sizes. In the fourth embodiment, each of the opposed first and second half nuts 3014a & 3014b, 3014c & 3014d, and 3014e & 3014f, for a selected male thread size R defines a set 3014. The system 3010 includes a single nut housing 3070 and a plurality of sets 3014, each set for a different selected male thread size R. All of the sets 3014 have the same nut width 3046 to engage the nut housing slot width 3106 and a nut breadth 3052 compatible with the nut housing slot length 3110. In this regard, "compatible with" refers to the slot length 3110 being greater than the nut breadth 3052 by at least the magnitude of the thread depth. The half nut sets 3014 could have identical nut breadths 3052, or variable nut breadths 3052, so long as the nut housing 3070 provides sufficient space for the set 3014ab, 3014cd or 3014ef with the greatest breadth 3052 to slide apart and fully disengage the male threads. In the fourth embodiment, the nut breadths 3052 are identical and the slot length 3110 is sufficient to accommodate the largest thread size of the plurality of sets 3014ab, 3014cd or 3014ef.

Figure 18:
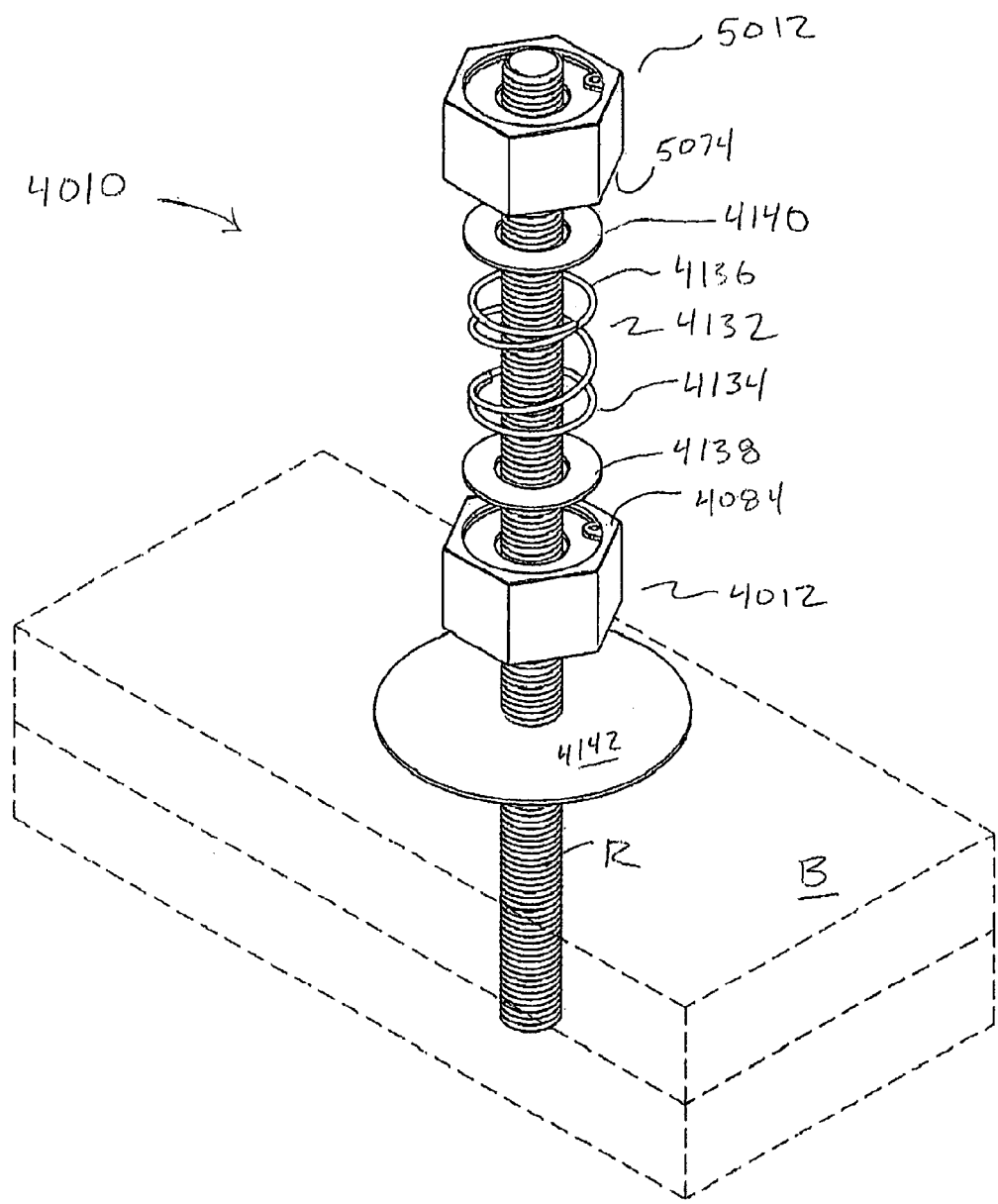
FIG. 18 shows a partially exploded perspective view of a fifth embodiment.
Figure 19:
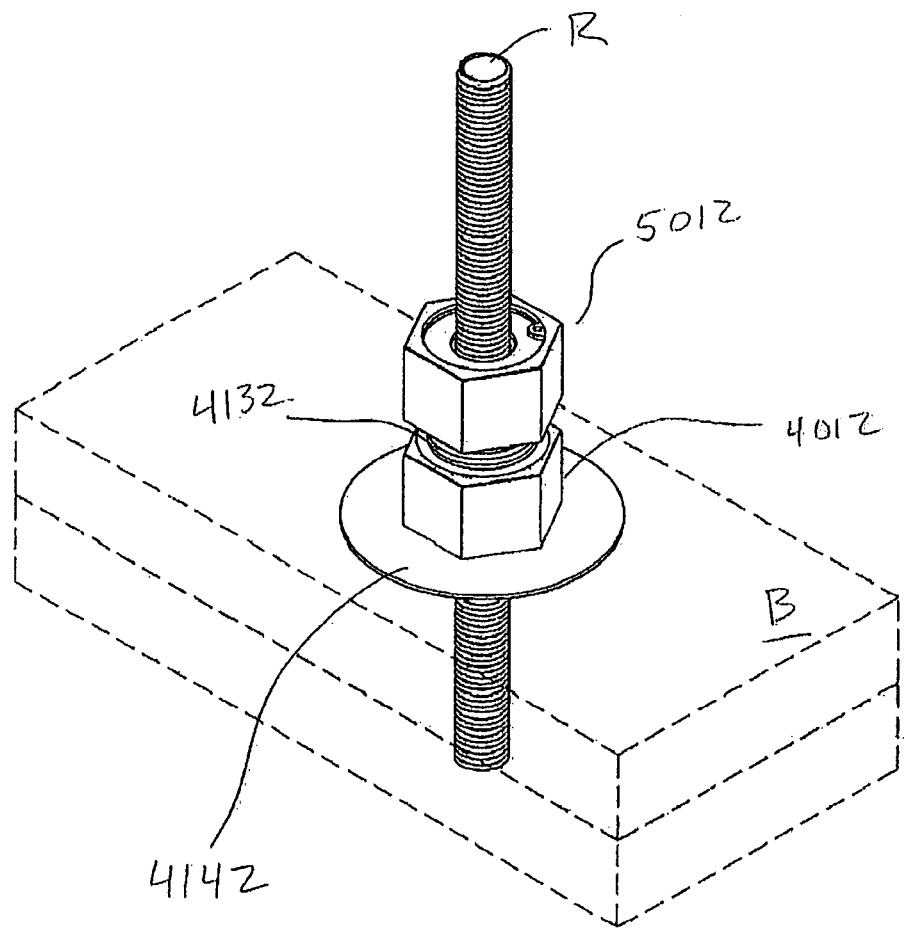
FIG. 19 shows a partially compressed perspective view of a fifth embodiment.

Referring to FIGS. 18-19, a fifth embodiment is shown, which is in essence two nut assemblies 4012 and 5012, similar to the assemblies described in the third embodiment, stacked with an interlineal compression member 4132 between them. A second nut assembly 5012 is provided to couple to the male threaded rod R having the second nut assembly nut housing end wall exterior surface 5074 oriented against the first nut assembly nut housing edge face 4084, and an interlineal compression member 4132 disposed between the first and second nut assemblies 4012 and 5012. Interlineal compression member 4132 has a first end 4134 engaged against the first nut assembly second plate 4124, and a second end 4136 engaged against the second nut assembly end wall exterior face 5074. In the embodiment, the interlineal compression element 4132 is a helical spring. In the embodiment, first and second interlineal plates 4138 and 4140 are provided to distribute pressure and provide bearing surfaces. A washer 4142 is disposed between first nut assembly 4012 and base plate B. In this way, the second nut assembly 5012 back-stops the first 4012, and the interlineal compression member 4132 provides constant additional pressure to drive the half nuts (not visible) against first nut assembly end wall interior surface tapered portion, such that as the coupled surface B pulls away—for example, the base plate of a house frame wall section shrinking—the first nut assembly 4012 half nuts will actually work downwards on the threaded rod R to self-tighten against the coupled surface B. Therefore, seismic and hurricane hold downs in wood frame built structures will not work loose over time.

Figure 20:
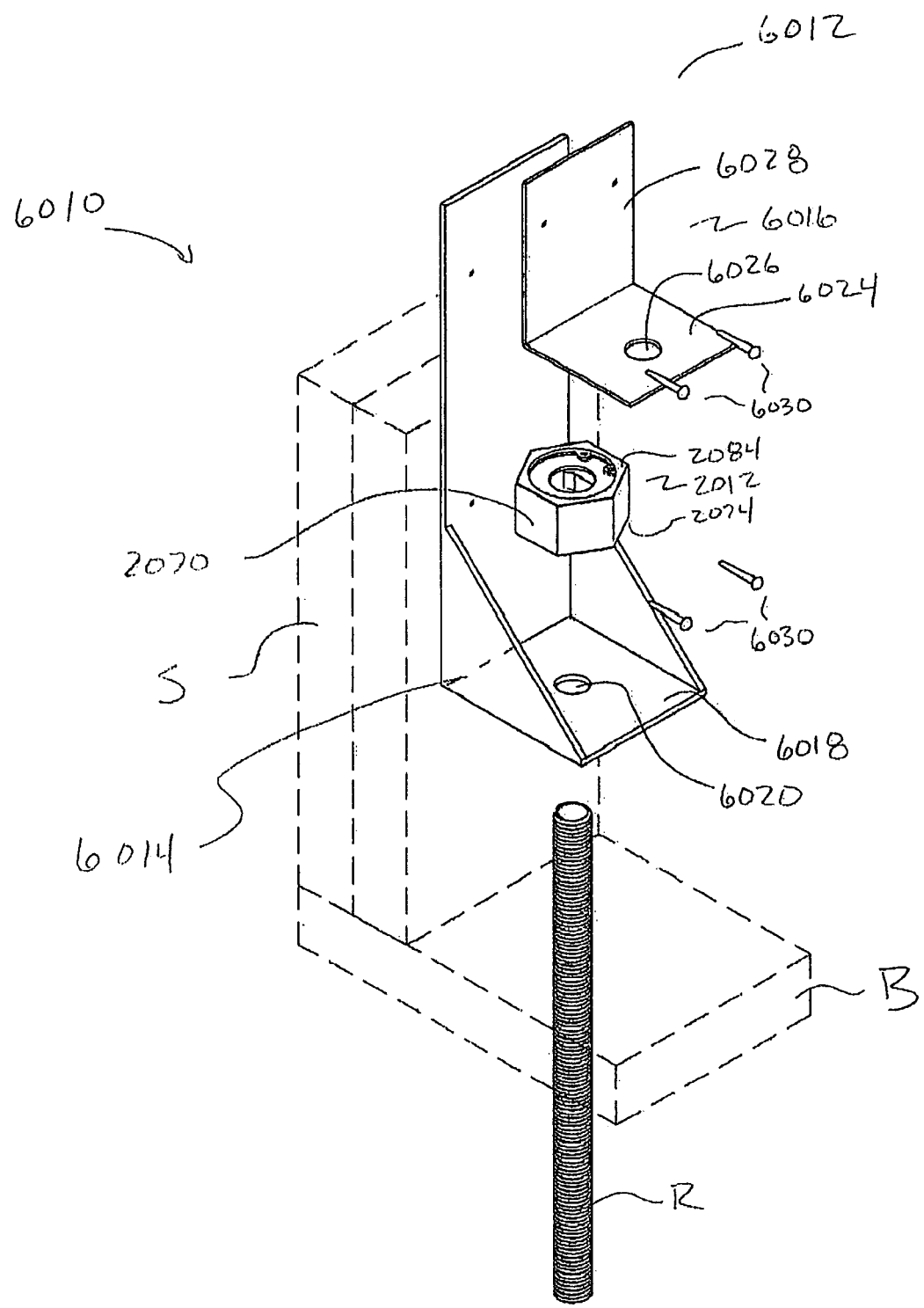
FIG. 20 shows a partially exploded perspective view of a sixth embodiment.
Figure 21:
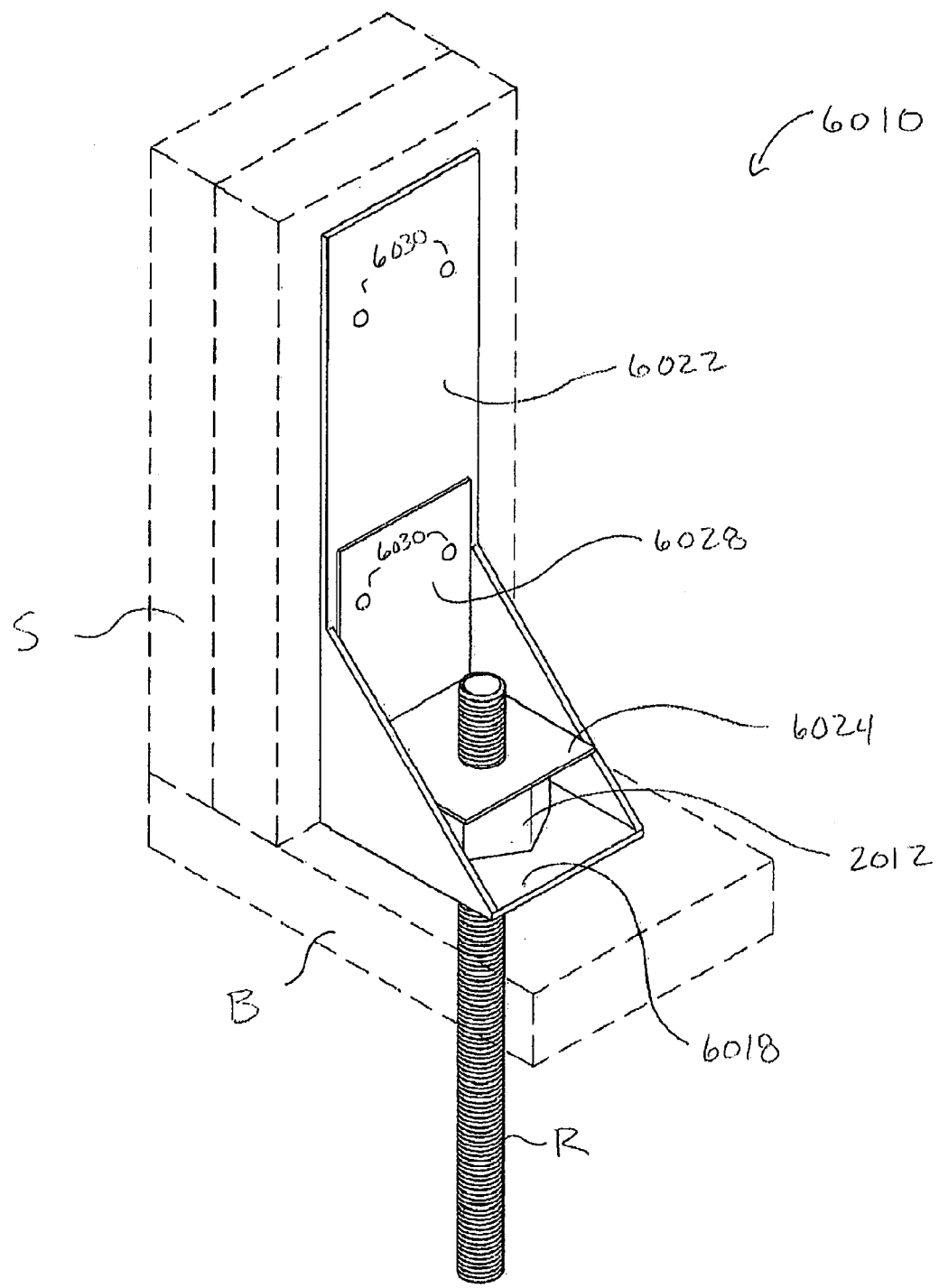
FIG. 21 shows a perspective view of a sixth embodiment, installed.
Figure 22:
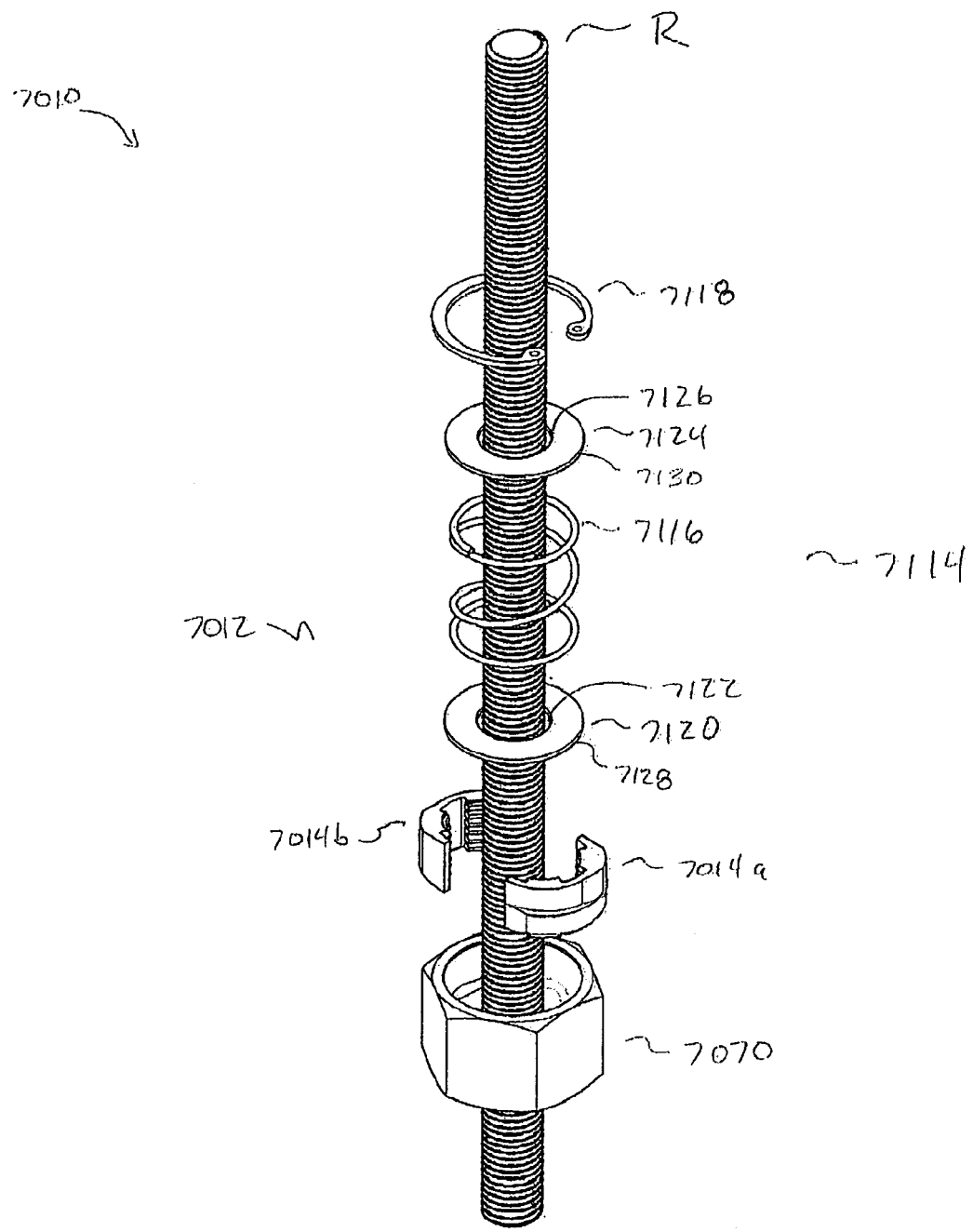
FIG. 22 shows an exploded view of a seventh embodiment.
Figure 23:
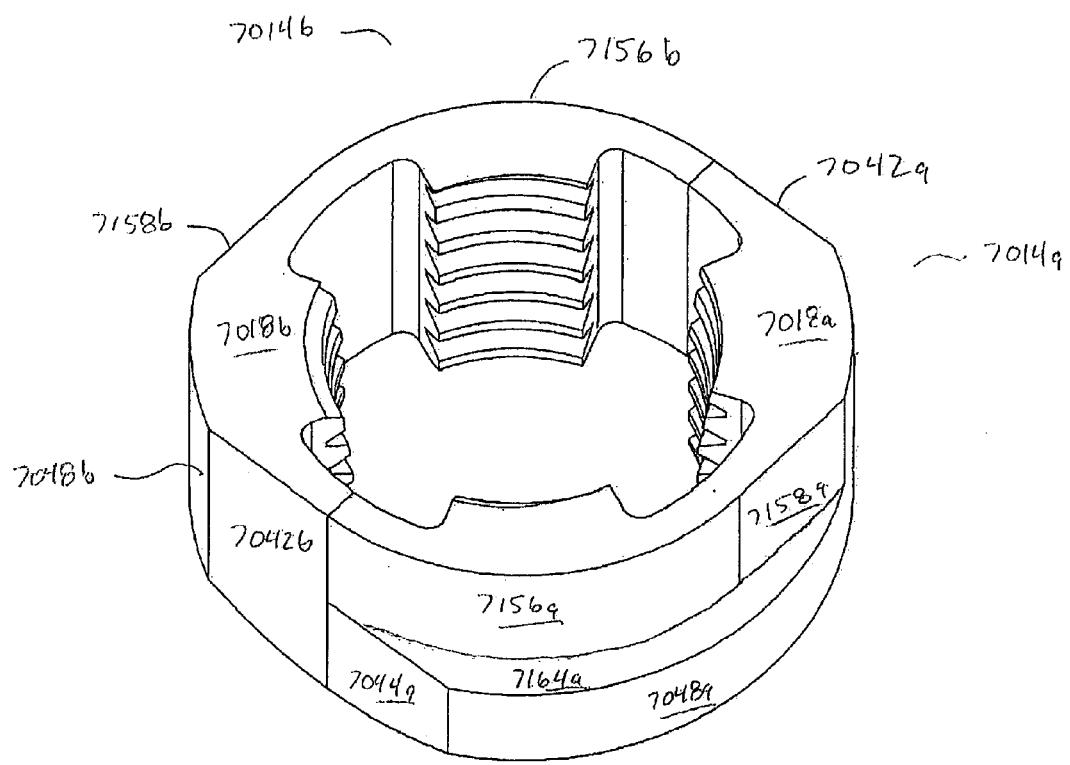
FIG. 23 shows a perspective view of a pair of half nuts of a seventh embodiment.
Figure 24:
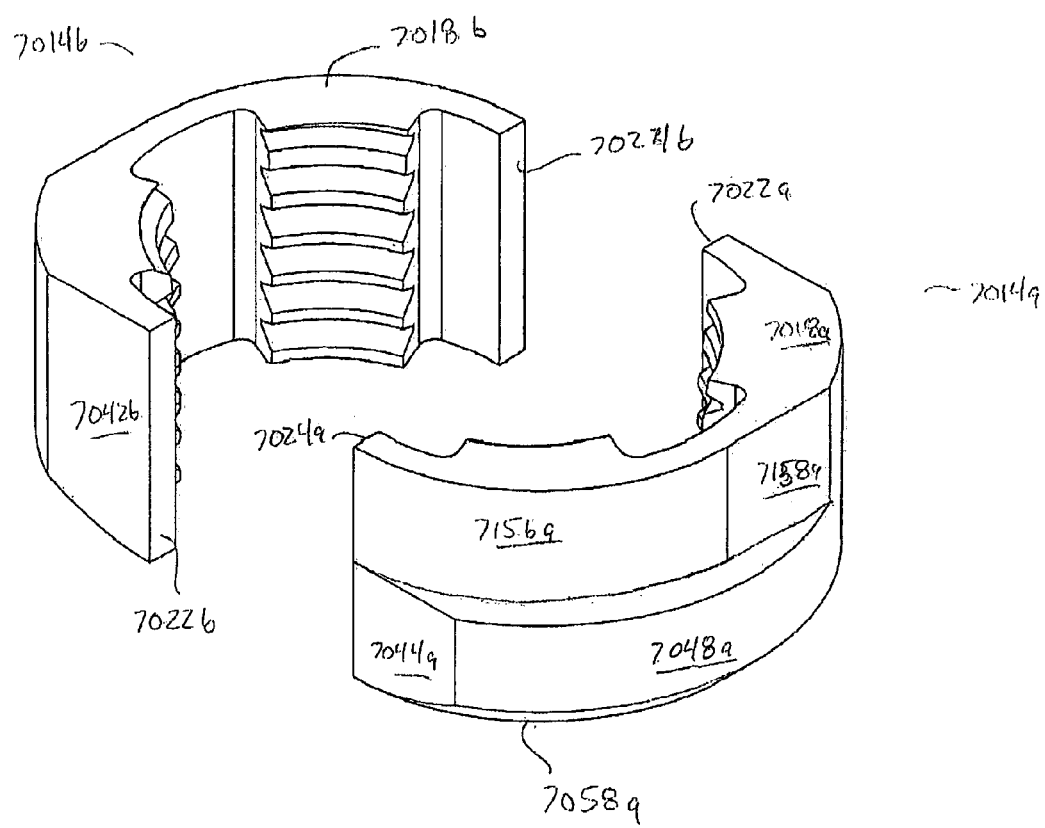
FIG. 24 shows a perspective view of a pair of half nuts of a seventh embodiment.
Figure 25:
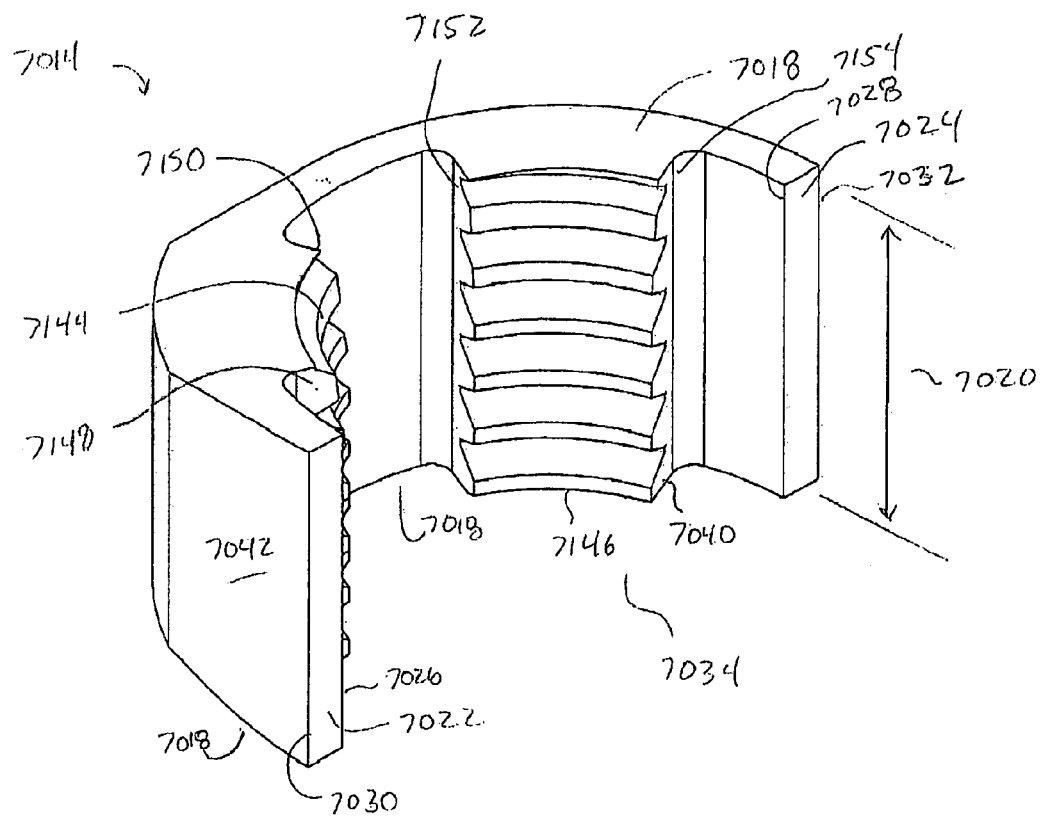
FIG. 25 shows a perspective view of a single half nut of a seventh embodiment.
Figure 26:
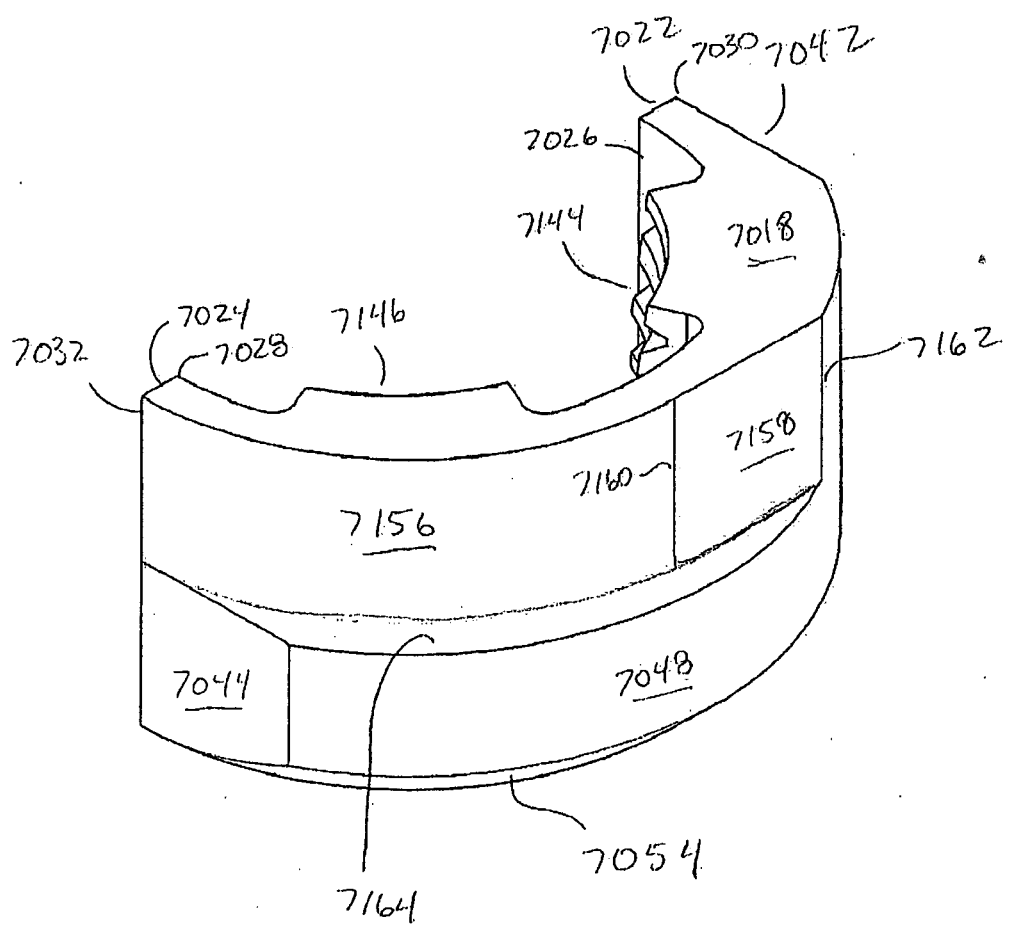
FIG. 26 shows a perspective view of a single half nut of a seventh embodiment.

Referring to FIGS. 20-21, a sixth embodiment 6010 is shown including a nut assembly 2012 as described in the third embodiment in combination with a vertical hold down bracket 6012. In the embodiment, a vertical hold down bracket 6012 includes bottom and top brackets, 6014 and 6016, respectively. Bottom bracket 6014 includes a first flange 6018 having a first oversized aperture 6020 to receive a male threaded rod R and a second flange 6022 extending from the first flange 6018 at an angle normal to the first flange 6018. Top bracket 6016 includes a first flange 6024 having a second oversized aperture 6026 to receive male threaded rod R and a second flange 6028 extending from the first flange 6024 at an angle normal to the first flange 6024. Bottom bracket first flange 6018 inserts over a threaded rod R through the first oversized aperture 6020 against a horizontal member B, and the bottom bracket second flange 6022 goes against a vertical member S to be coupled to the horizontal member B. Nut assembly 2012 inserts over the threaded rod R and against the bottom bracket first flange 6018 with the end wall exterior surface 2074 against the first flange. Top bracket 6016 inserts over the threaded rod R to press the top bracket first flange 6024 tightly against the nut assembly nut housing edge face 2084 and the top bracket second flange 6028 against the bottom bracket second flange 6022 (and vertical member S). A plurality of fasteners 6030 couples to the vertical member S through the top and bottom bracket second flanges 6022 and 6028, respectively. In this regard, "oversized" means an opening greater than the cross section of the anticipated range of threaded rods, such that the brackets may be adjusted to butt against the vertical member. With this system, nut assembly 2012 provides reliable long term hurricane and seismic connections regardless of the amount of wood shrinkage and flexing during the life of the structure. Any lifting or bending by vertical member S relative to horizontal member B will push up against nut assembly 2012, causing the half nuts (not shown) to clamp more tightly against threaded rod R, and preventing movement. As frame members shrink, nut housing 2070 will slide down threaded rod R slightly, thereby reducing engagement of the half nuts against threaded rod R, and the half nuts will work down the rod under pressure from the internal resilient member 2116 (not shown in this view).

Referring to FIGS. 22-40, a seventh embodiment 7010, adapted for repairing damaged threads, is shown. The seventh embodiment includes a nut assembly 7012 to engage male threaded rod R nut housing 7070 to receive first and second half nuts 7014a & b, a compression portion 7114, and a retaining element 7118.

Still referring to FIGS. 22-40 in the seventh embodiment, each first and second half nut 7014a, 7014b is asymmetrical and identical to each other. Therefore, a single half nut 7014 will be described in detail. Each half nut 7014 includes opposed first and second axial ends 7016 and 7018, the distance between the axial ends 7016 and 7018 defining the nut depth 7020. First and second end faces 7022 and 7024 extend from the respective interior edge 7026 and 7028 to an exterior edge 7030 and 7032, respectively, and from the first axial end 7016 to the second axial end 7018, and parallel to each other.

Female threaded interior surfaces 7034 include interrupted female thread sections 7144 and 7146, adapted to engage a selected male thread T, and having thread depth 7040. In the embodiment, each interior surface 7034 includes first and second interrupted thread sections 7144, and 7146, respectively. Each first interrupted thread section 7144 extends from a first thread edge 7148, to a second thread edge 7150. Each second interrupted thread section 7146 extends from a third thread edge 7152 to a fourth thread edge 7154. Interrupted thread edges 7148, 7150, 7152 and 7154 form sharp cutting edges in order to cut through and repair damaged male threads on a threaded rod R. Interrupted thread sections 7144 and 7146 are provided in order to provide additional cutting edges and for positive engagement around intermittent damaged regions of male threaded rod R. Additionally, the gaps between interrupted thread sections 7144 and 7146 provide space for shavings to displace during thread cutting. Female threaded portion 7036 may be tapered to ensure maximum pressure only on a narrow band of male threads, or may be straight.

Each half nut 7014 includes a first full exterior flat 7042 and an opposing second partial exterior flat 7044 disposed proximate the first and second end face exterior edges 7022 and 7024, respectively, with the distance between the first and second exterior flats defining the nut width 7046. First back wall 7048 extends between the first and second exterior flats 7042 and 7044. In the embodiment, first back wall 7048 traces a constant-radius curve between first and second exterior flats 7042 and 7044. Second back wall 7156 is displaced inwardly from first sidewall 7048, tracing a constant radius curve from proximate second face 7024 exterior edge 7032 to a first edge 7160 of a partial third flat 7158, creating shoulder 7164 to engage second lips 7178 or 7180 of nut housing 7070. In the embodiment, second back wall 7156 blends into third flat 7158 at first edge 7160 to form a continuous smooth surface without a sharp edge, to facilitate rotation within nut housing 7070, as discussed below. Third flat 7158 is a partial flat, extending axially from second axial end 7018 to shoulder 7164, and circumferentially from first edge 7160 to a second edge 7162. The distance between third flats 7158a and 7158b of first and second half nuts 7014a and 7014b when engaged around threaded rod R is equal to the nut width 7046. First back wall 7048 extends full breadth from proximate first axial end 7016 to proximate second axial end 7018.

Figure 27:
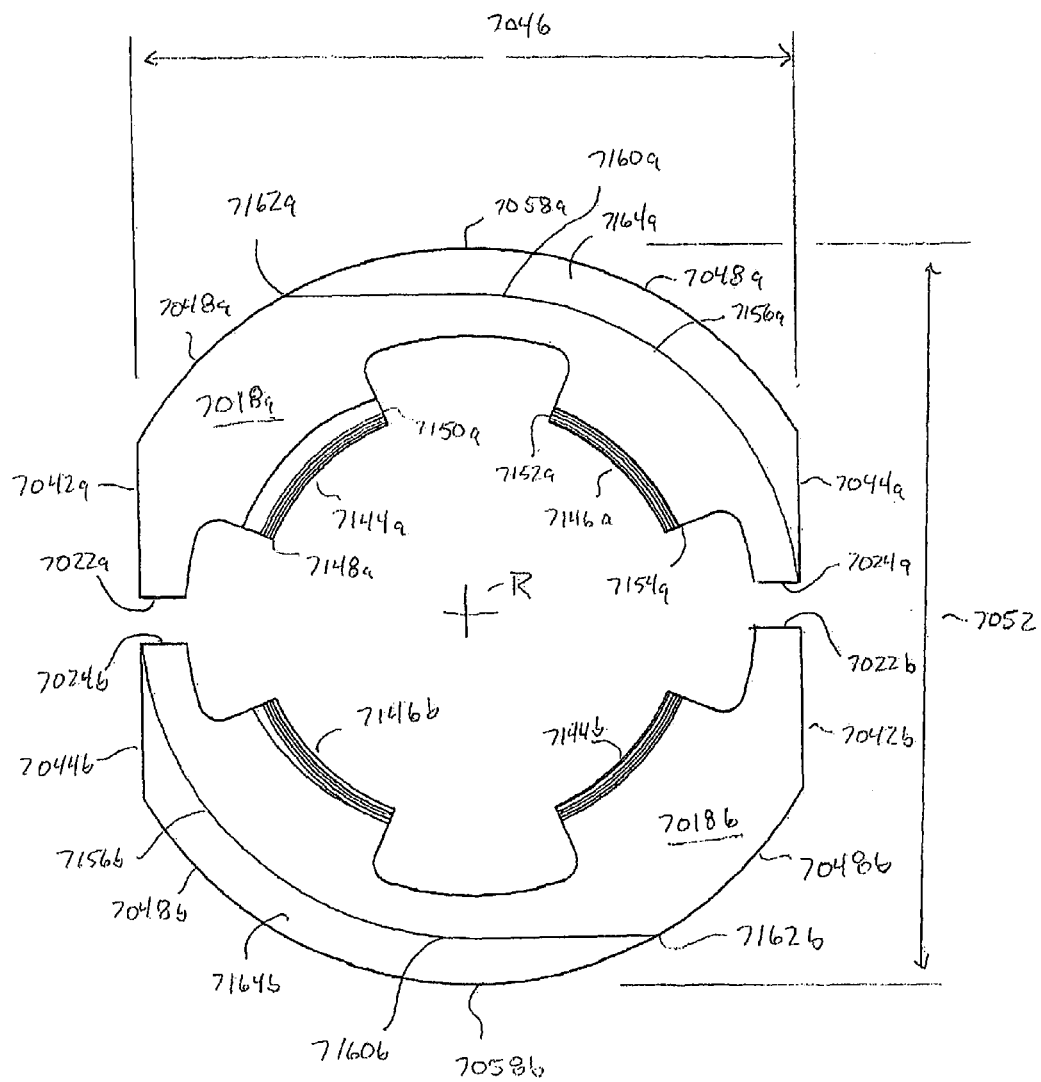
FIG. 27 shows plan view of a pair of half nuts of a seventh embodiment, from the second axial end.
Figure 28:
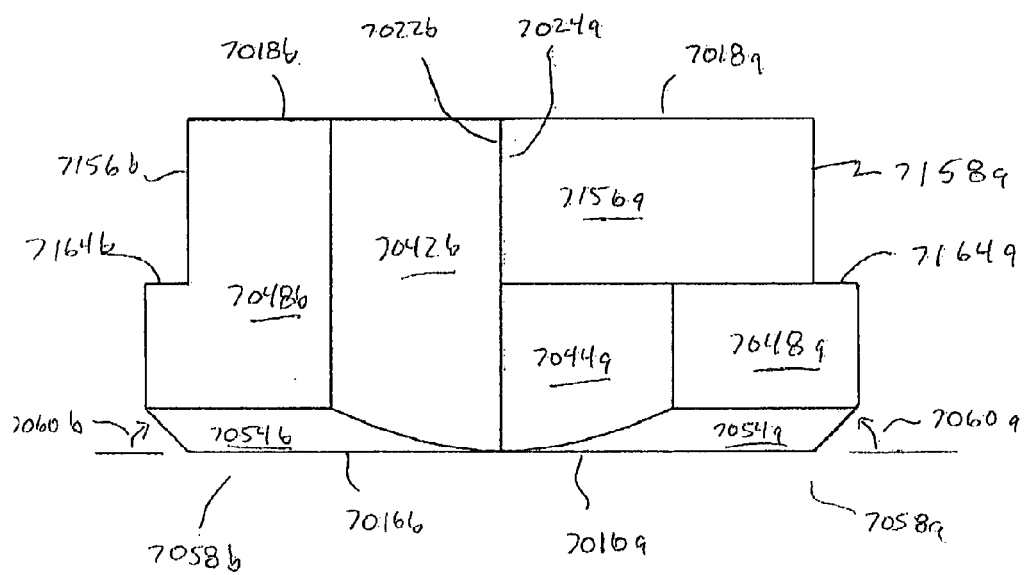
FIG. 28 shows a side view of a pair of half nuts of a seventh embodiment.
Figure 29:
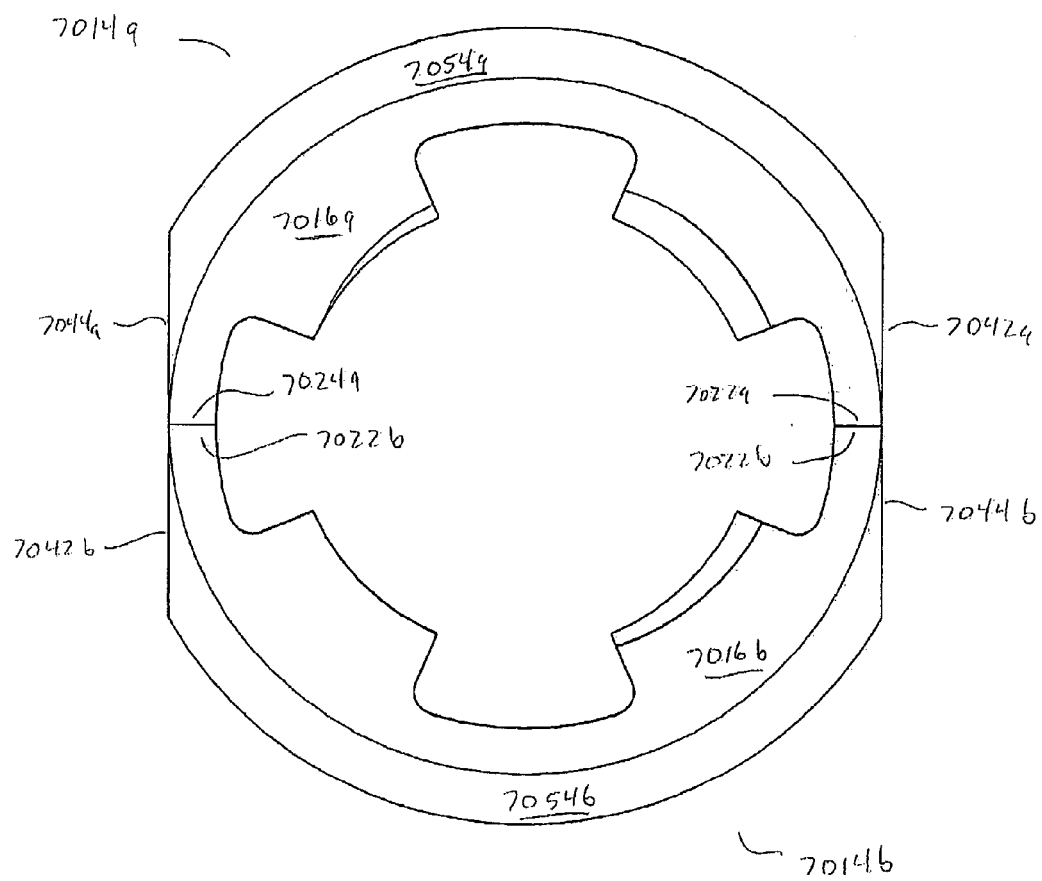
FIG. 29 shows plan view of a pair of half nuts of a seventh embodiment, from the first axial end.
Figure 30:
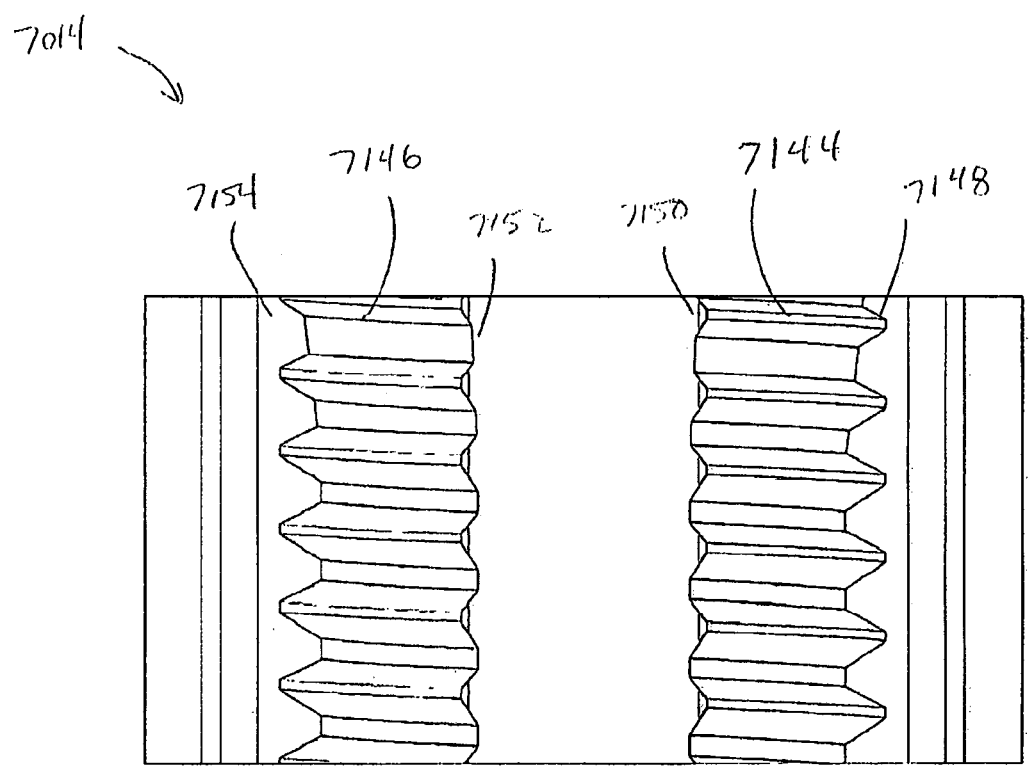
FIG. 30 shows a side view of a half nut of a seventh embodiment, facing the interior.
Figure 31:
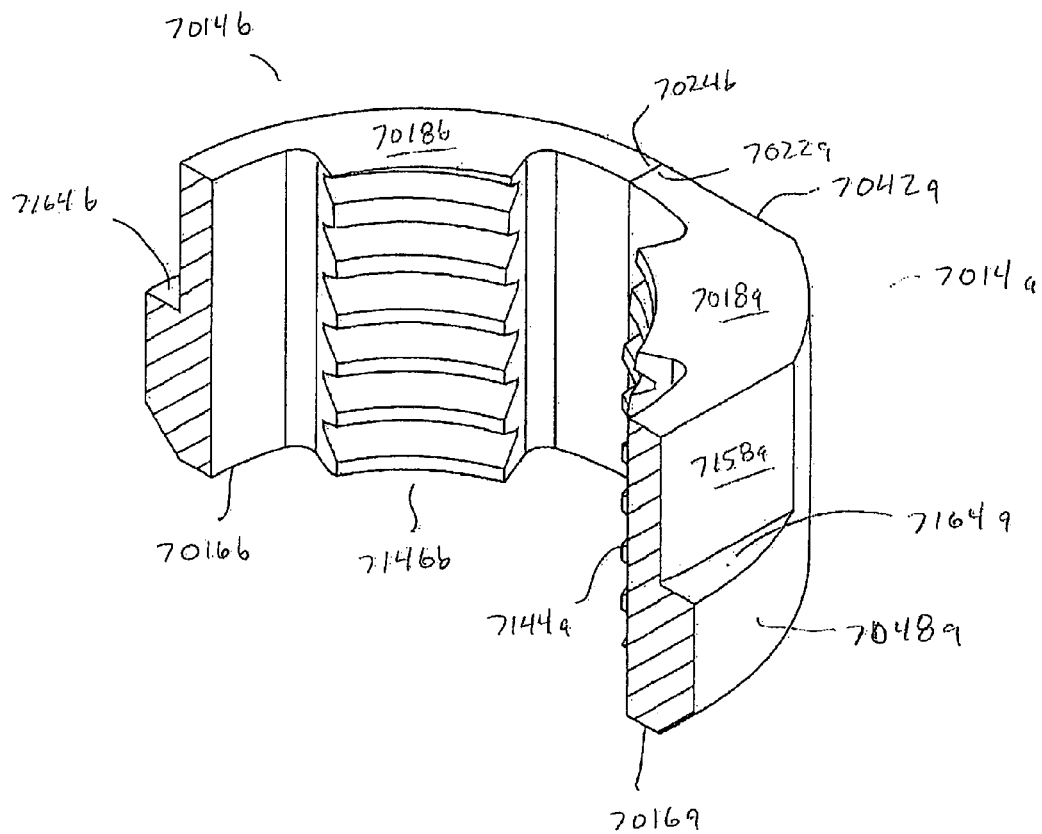
FIG. 31 shows a cross section cutaway view of a pair of half nuts of a seventh embodiment.
Figure 32:
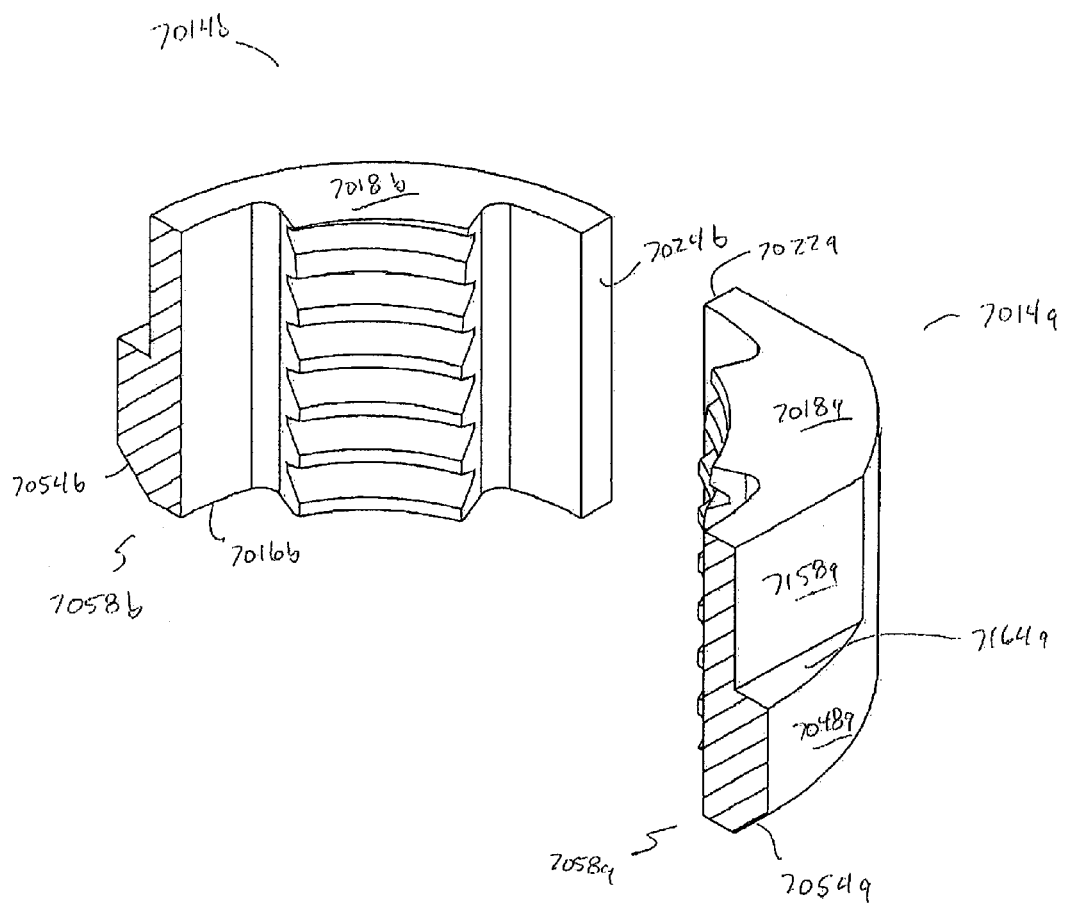
FIG. 32 shows a cross section cutaway view of a pair of half nuts of a seventh embodiment.
Figure 33:
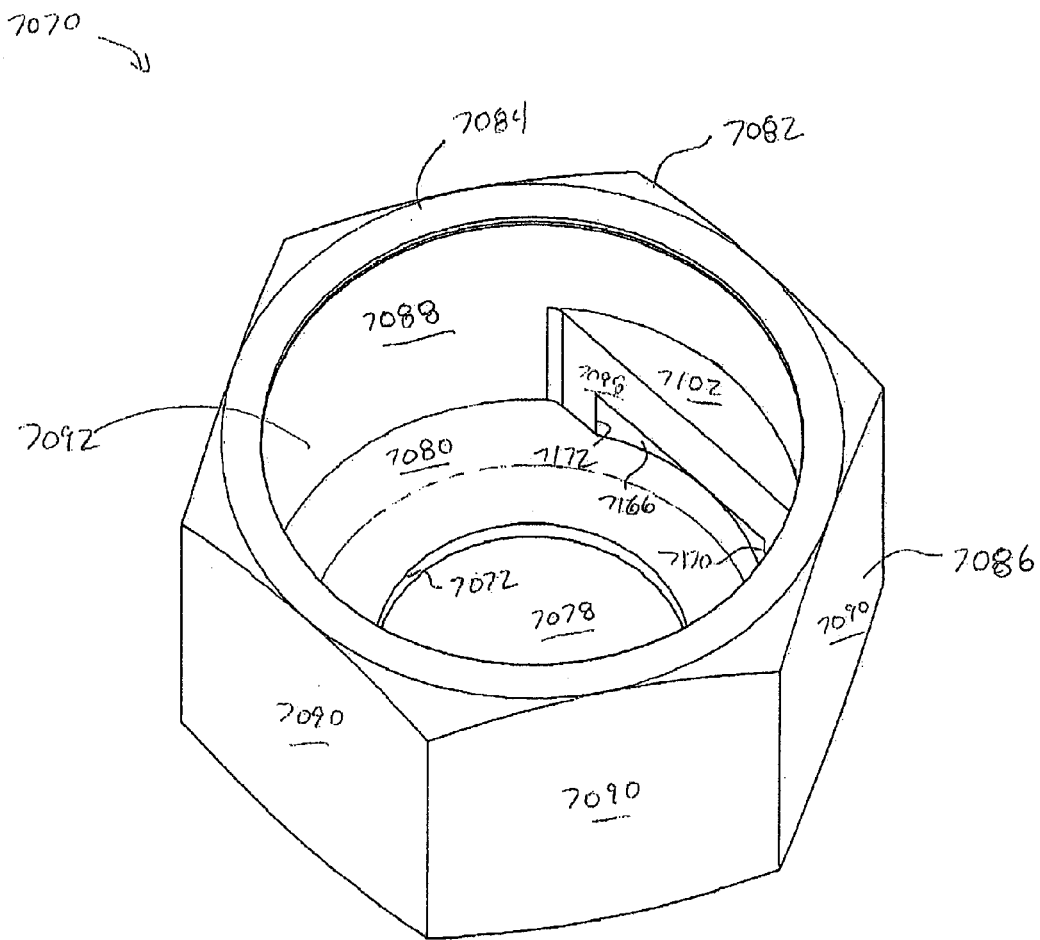
FIG. 33 shows a perspective view of the interior of a nut housing of a seventh embodiment.
Figure 34:
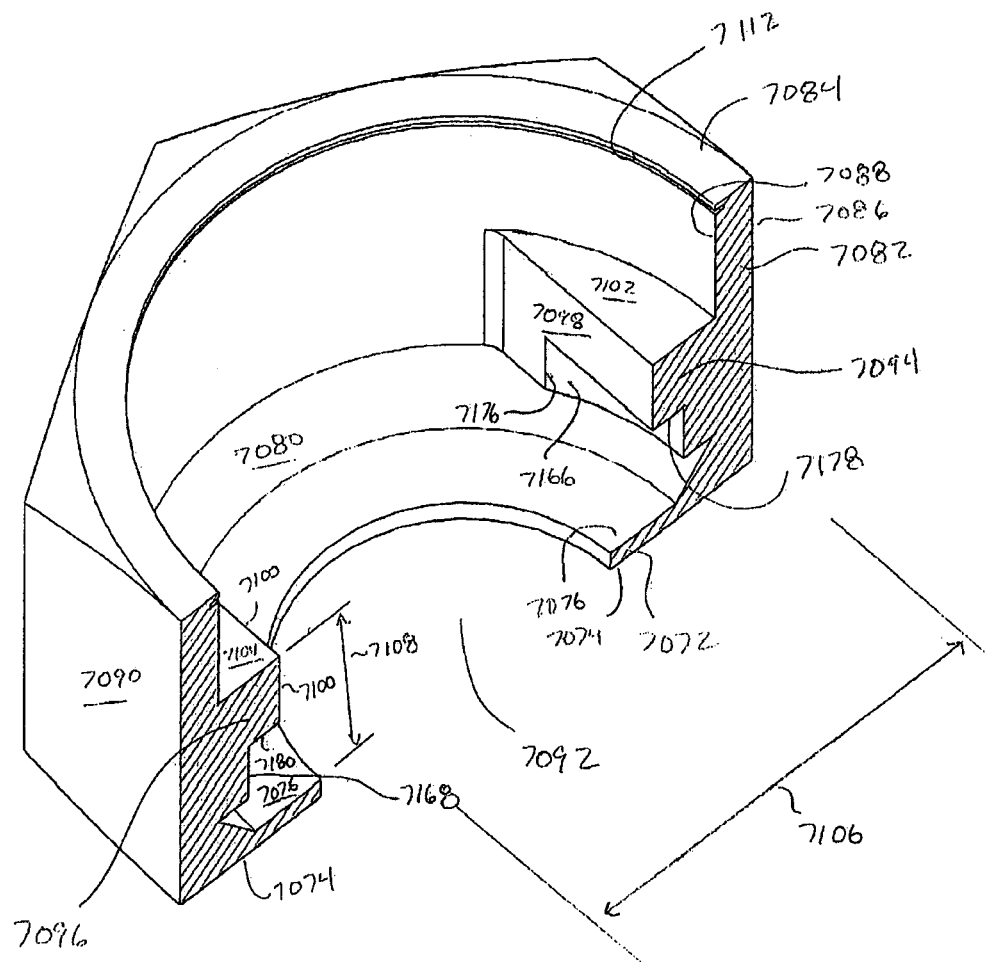
FIG. 34 shows a cutaway view of a nut housing of a seventh embodiment.
Figure 35:
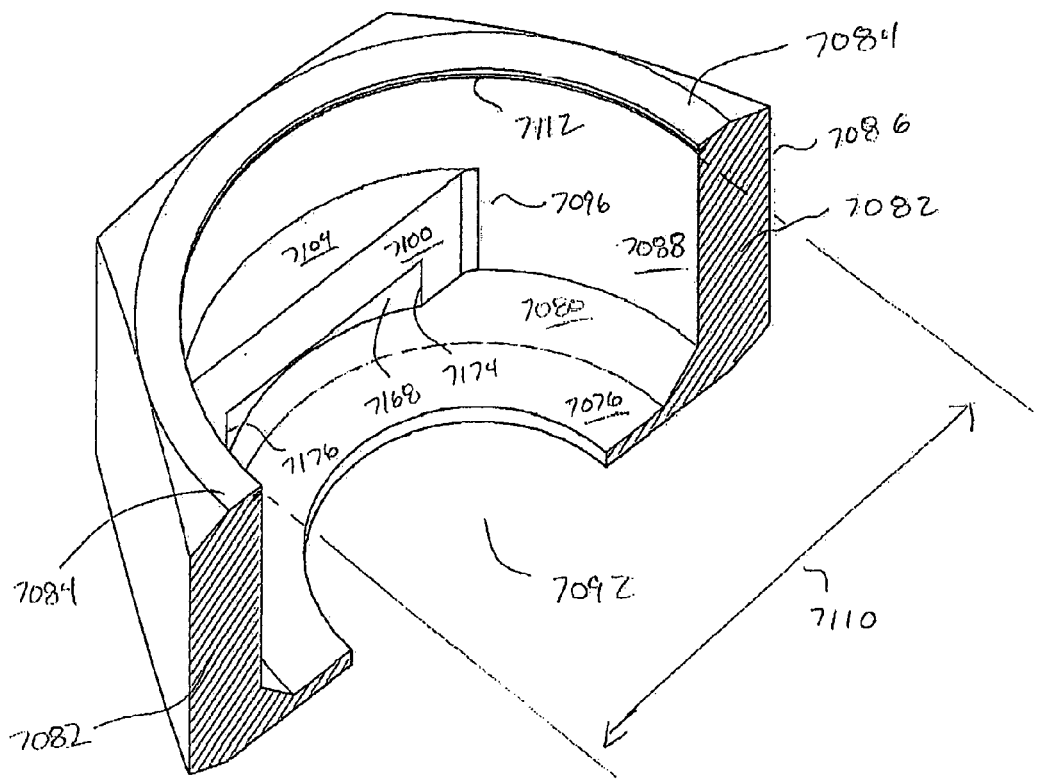
FIG. 35 shows a cutaway view of a nut housing of a seventh embodiment.

Referring to FIG. 27, the maximum distance between opposed points 7050a and 7050b on the respective first and second half nut first back walls 7048a and 7048b when the first and second half nuts 7014a, 7014b are fully engaged against a threaded rod R defines the nut breadth 7052. First bevel surface 7054a, 7054b extends along the intersection of the back wall 7048a, 7048b and the first axial end 7016a, 7016b, defining a half nut first beveled end 7058a, 7058b and having a first bevel angle 7060a, 7060b. When the first and second half nuts 7014a, 7014b enclose a threaded rod R having the selected male thread T the respective first and second end faces 7022a, 7022b and 7024a, 7024b of the first and second half nuts 7014a, 7014b do not contact each other. This ensures that they will not interfere with the compression exerted on the half nuts.

Still referring to FIGS. 22-40, in the seventh embodiment 7010 nut housing 7070 includes an end wall 7072 having opposed exterior and interior surfaces 7074 and 7076 and a center aperture 7078, the end wall interior surface including a concave tapered portion 7080 centered on the center aperture 7078 and matching the first bevel angle 7060 to receive a half nut beveled end 7058. End wall exterior surface 7074 has a flat face. Enclosing sidewalls 7082 extending from the end wall 7072 to an edge face 7084 and have exterior and interior surfaces 7086 and 7088, respectively, the edge face 7084 parallel to the end wall exterior face 7074. Side wall exterior surfaces 7086 are adapted to receive a torque device. In the embodiment, nut housing 7010 is configured similar to the previously described nut housings, with side wall exterior surfaces 7086 include six hexagonal flats 7090 to receive a conventional flat wrench, but other configurations could be used, for example a square nut, star nut or other configurations. The interior surfaces of the end wall 7076 and sidewalls 7088 define a cavity 7092 to receive first and second half nuts 7014a, 7014b, respectively. Opposed first and second interior flats 7094 and 7096, respectively, project into the cavity 7092 proximate the end wall tapered portion 7080, each of the first and second interior flats 7094 and 7096 including a flat engagement surface 7098, 7100, respectively, and a first shoulder surface 7102, 7104, respectively, distal from the nut housing end wall interior surface 7076. The distance between the flat engagement surfaces defines a slot width 7106 not less than the nut width 7046a, 7046b so as to slidingly engage the half nut first and second exterior flats 7042a/b and 7044a/b, respectively, or the third exterior flats 7158a and 7158b, and the maximum distance 7108 from the end wall interior surface 7076 to the first shoulder surface 7102 or 7104 is less than the nut depth 7020.

Opposed first and second semi-circular engagement surfaces 7166 and 7168 are recessed under first and second interior flats 7094 and 7096, respectively, creating a second lip 7178 and 7180 opposing first shoulder surface 7102, 7104, respectively. First semi-circular engagement surface 7166 extends from a first edge 7170 to a second edge 7172, and second semi-circular engagement surface 7168 extends from a first edge 7174 to a second edge 7176. In the embodiment, each semi-circular engagement surface 7166, 7168 is concave and open to cavity 7092, having a constant radius of curvature less than that of sidewall interior surface 7088, and equal to that of first sidewall 7048. First and second flat engagement surfaces 7098 and 7100 extend around the edges 7170, 7172 and 7174, 7176 of semi-circular engagement surfaces 7166 and 7168, respectively, to form flat extensions 7182, 7184 and 7186, 7188, respectively. The height of first and second semi-circular engagement surfaces 7166 and 7168 is approximately equal to the height of half nut projecting shoulder 7164 to receive the projection portion therein.

The distance between sidewall interior surfaces 7088 across the cavity 7092 in the axis parallel to the interior flats 7094, 7096 defines a slot length 7110 greater than the nut breadth 7052. This allows the half nuts to disengage from threaded rod R during downward movement. In the embodiment, slot length 7110 is greater than nut breadth 7052 by at least twice the thread depth 7040 in order to allow half nuts 7014a, 7014b to fully disengage threaded rod R. In the embodiment, side wall interior surface 7086 includes a channel 7112 circumscribing the surface proximate edge face 7084, the channel 7112 to receive a snap ring 7118.

In the embodiment, bevel edge 7060a & 7060b and tapered portion 7080 have a slope in the range 10-15 degrees, and preferably approximately 10 degrees.

In practice, nut width 7046a & 7046b will be slightly less than the slot width 7106 to permit insertion into the nut housing.

Referring again to FIG. 22, in the seventh embodiment compression portion 7114 includes a resilient member 7116 disposed within the nut housing cavity 7092 to urge the first and second half nuts 7014a, 7014b, respectively, against the end wall interior surface 7076. Retaining element 7118 retains the resilient member 7116 within the nut housing cavity 7092. In the seventh embodiment, resilient member 7116 is a helical spring, and retaining element 7118 is snap ring insertable into channel 7112 in combination with second plate 7124.

Referring again to FIG. 22, in the first embodiment compression portion 7114 includes a first plate 7120 having a center aperture 7122 and movably disposed between the resilient member 7116 and the first and second half nuts 7014a & 7014b, respectively, and a second plate 7124 having a center aperture 7126 and movably disposed between the resilient member 7116 and the retaining element 7118. First plate 7120 provides more equal distribution of pressure from spring 7116 against first and second half nuts

7014a, 7014b to ensure they remain aligned with each other and against tapered portion 7080. In the embodiment, the outer perimeter edges 7128 and 7130 of first and second plates 7120 and 7124, respectively, approximately match the cross section of cavity 7092 and side wall interior surfaces 7088, so that they slide alongside wall interior surfaces 7088 without becoming cockeyed.

In the seventh embodiment, each of first and second half nut first back walls 7048a & 7048b have an arcuate cross section, and more specifically a partial circular cross section, and nut housing end wall interior surface tapered portion 7080 forms a concave frustum centered on aperture 7078.

The arcuate cross section and frustum arrangement provide for more even compression around the perimeter of first and second half nut first beveled ends 7058a & 7058b, respectively, from tapered portion 7080, which is especially useful for high torque scenarios, such as thread repair cutting. Additionally, a non-circular cross section for beveled ends 7058a & 7058b, and tapered portion 7080, creates a complex surface which is difficult to machine with precision.

Alternatively, first and second half nut back walls may be substantially rectangular in cross section, such that the first beveled surfaces would comprise essentially triangular wedges, with end wall interior surface tapered portion formed into corresponding opposed flat tapered surfaces.

In the embodiment, resilient member 7116 is a helical spring, but other resilient systems such as flat springs, pneumatics, or opposing magnets could be used depending on size, cost and chemical environment, for instance. The fastener system can be easily scaled up or down for a given application.

In operation, the seventh embodiment provides an ability to cut and/or repair threads along a male threaded rod R, operating similarly to the embodiments described previously, and may be used as a common system. First and second half nuts 7014a/b are inserted into nut housing 7070, with beveled edges 7054a/b oriented against tapered interior surface 7080, and opposed first and second exterior flats 7042a/b and 7044a/b aligned against flat engagement surfaces 7098 and 7100. Compression portion 7114, including first and second plates 7120 and 7124 with resilient spring 7116 disposed between are inserted and retaining element 7118 installed. First and second half nuts 7014a/b are identical, rather than mirror images, so when inserted into nut housing 7070 the first half nut 7014a first end face 7022a will abut second half nut 7014b second end face 7024b, and first half nut 7014a second end face 7024a will abut second half nut first end face 7022b. Similarly, first half nut 7014a first flat 7042a will be proximate second half nut 7014b second flat 7044b, and first half nut 7014a second flat 7044a will be proximate second half nut 7014b first flat 7042b. Opposed first and second half nuts 7014a and 7014b slide apart within cavity 7092 along slot length 7110 as the assembly 7012 is inserted over and along the length of rod R to a location slightly beyond a damaged thread region. At this point assembly 7012 is pulled upward to drive tapered surface 7080 against beveled edges 7054a/b which forces half nuts 7014a/b together to compress interrupted thread portions 7144a/b and 7146a/b against threaded rod R to engage the male threads. When interrupted thread portions are engaged, the operator rotates assembly 7012 in the direction to loosen the nut assembly (which is conventionally counterclockwise), which causes nut housing 7070 to rotate in relation to first and second half nuts 7014a/b until first sidewalls 7048a/b with projecting shoulders 7164a/b are engaged against semi-circular engagement surfaces 7166 and 7168, respectively, and nut housing lower lips 7178 and 7180, respectively. First and second half nut third flats 7158a/b will then be engaged against nut housing interior flat engagement surfaces 7098 and 7100, respectively, and first and second half nuts 7014a/b will be locked in place in maximum compression, so that high torque may be applied to cut into damaged threads in order to repair them. As assembly 7012 rotates (with half nuts 7014a/b locked in place and highly compressed against threaded rod R), interrupted thread edges 7148 and 7152 will cut through and/or reform material to clear and repair damaged threads, or form new threads. When thread repair operations are complete, assembly 7012 may be counter-rotated to disengage projecting shoulders 7164a/b, allowing half nuts 7014a/b to slide apart slightly and loosen so they can be removed without cutting the entire thread length of threaded rod R.

Figure 36:
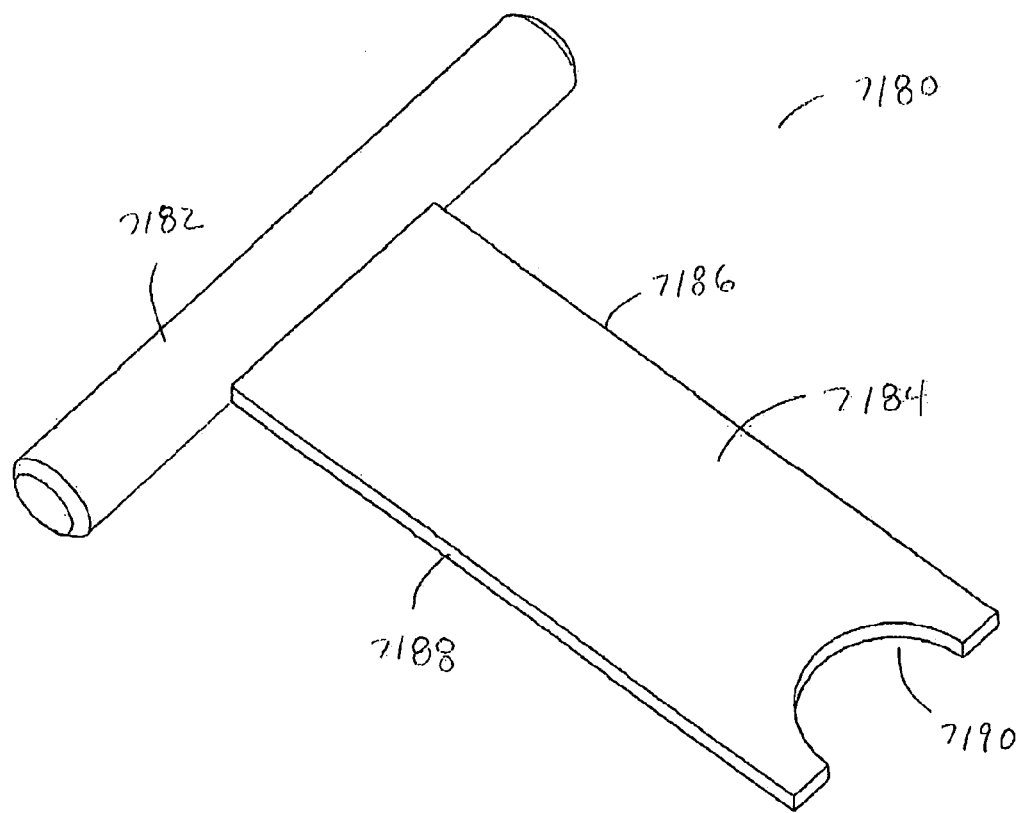
FIG. 36 shows a tool for operating a seventh embodiment.
Figure 37:
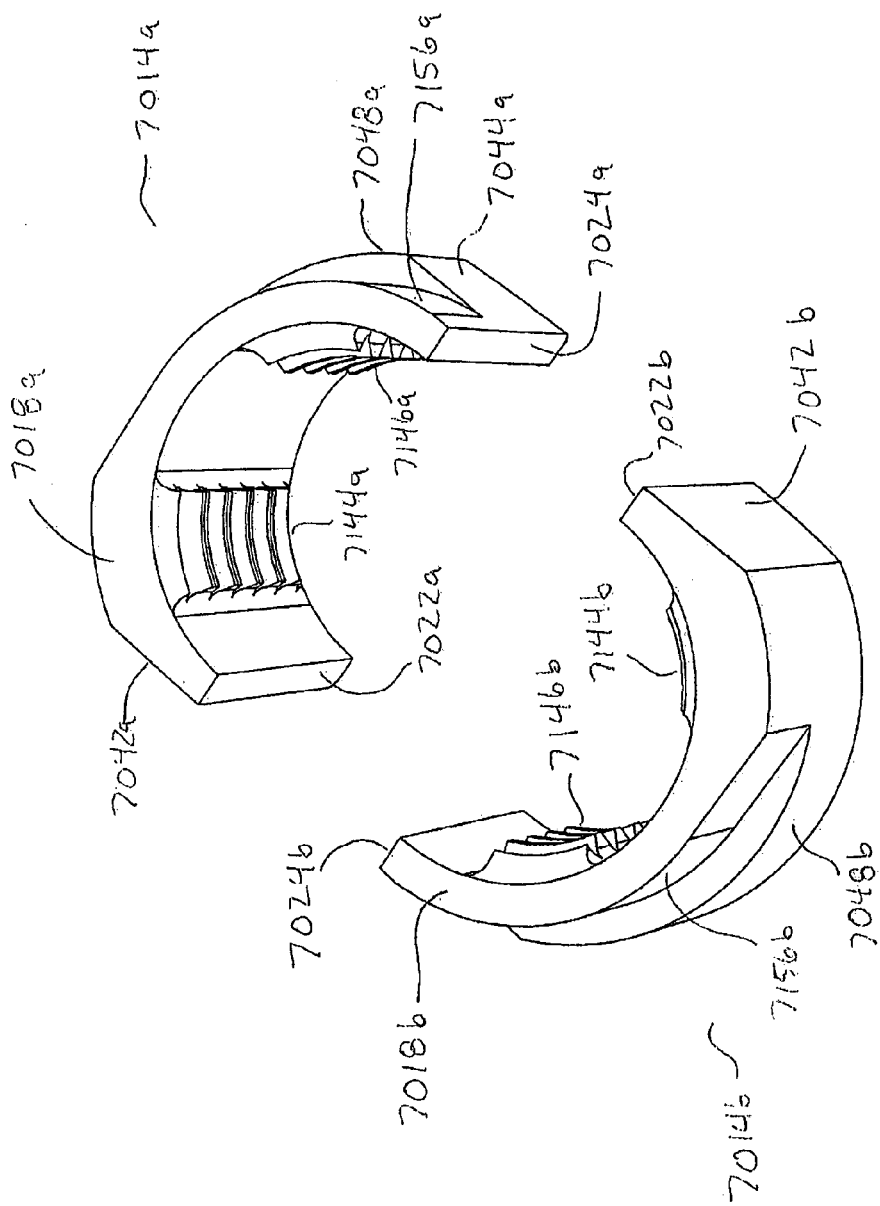
FIG. 37 shows a top perspective view of a pair of half nuts of a seventh embodiment.
Figure 38:
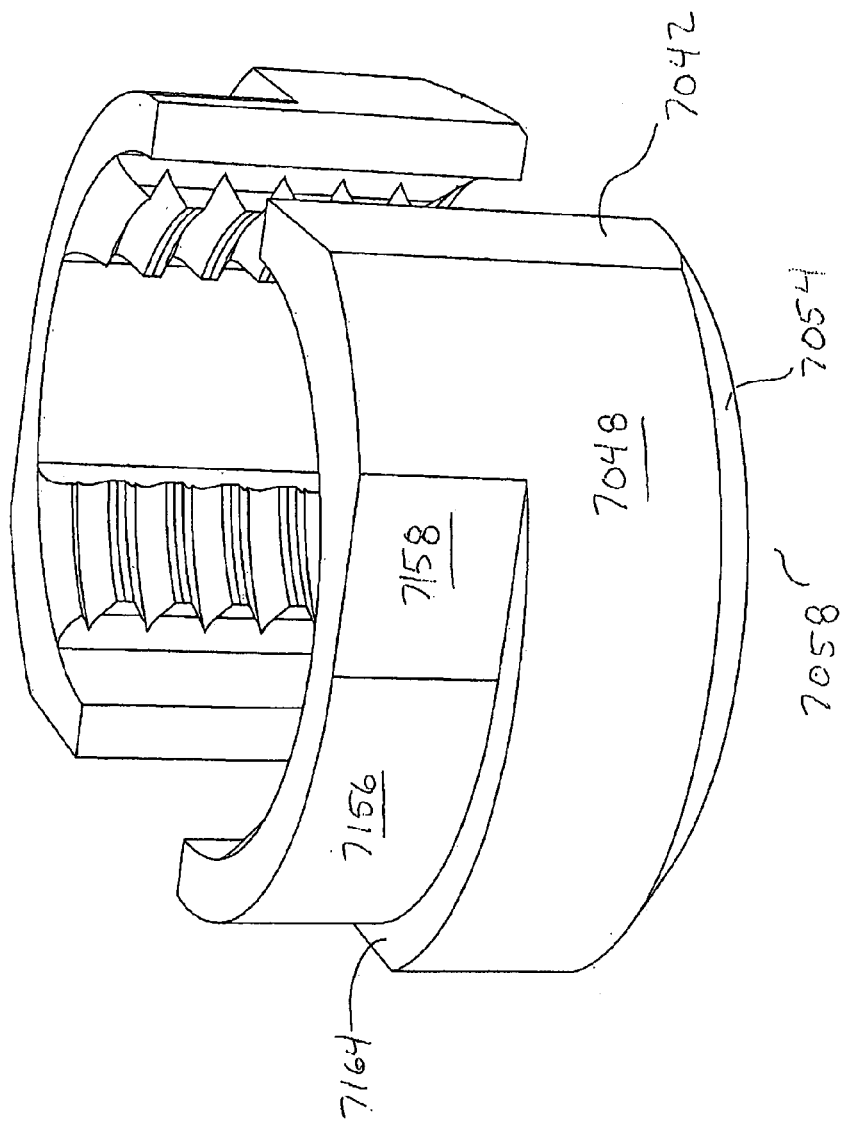
FIG. 38 shows a side perspective view of a pair of half nuts of a seventh embodiment.
Figure 39:
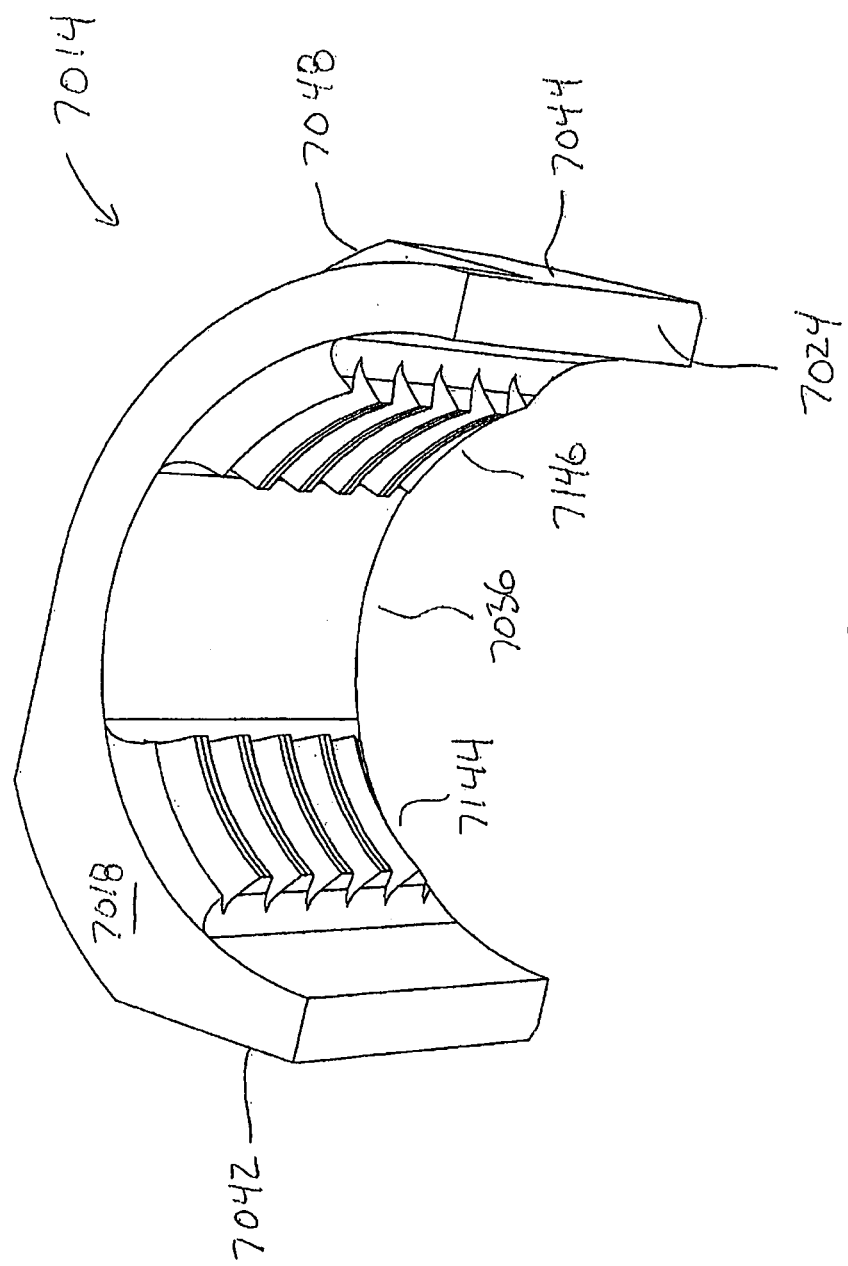
FIG. 39 shows an interior detail view of a half nut of a seventh embodiment.
Figure 40:
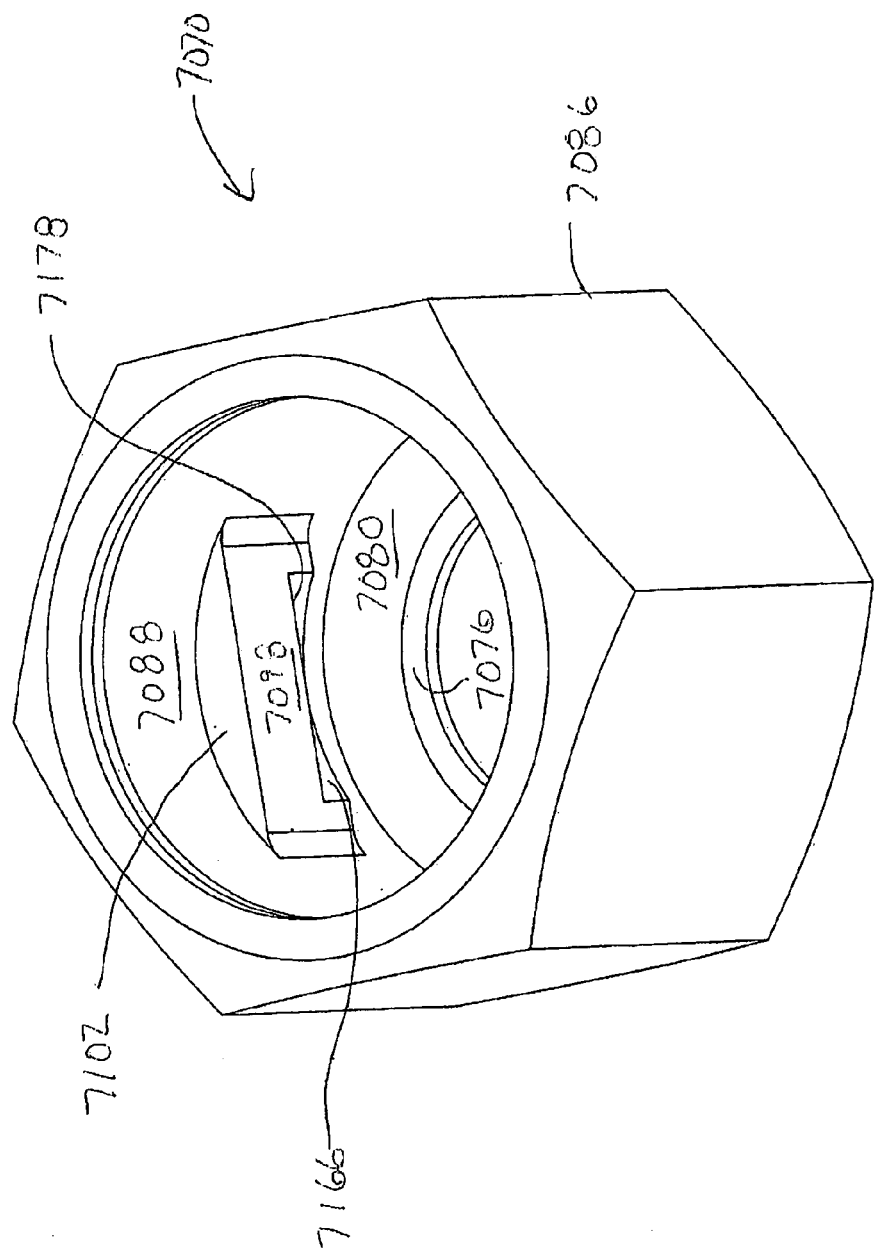
FIG. 40 shows a perspective view of the interior of a nut housing of a seventh embodiment.

Referring to FIG. 36, a tool 7180 is provided which is useful with the seventh embodiment for engaging or disengaging the half nuts 7014a/b into semi-circular engagement surfaces 7166 and 7168. Tool 7180 includes a handle 7182 and a flat bar 7184 projecting from handle 7182, the flat bar 7184 extending widthwise from a first edge 7186 to an opposed second edge 7188 defining a tool width. In the embodiment, the tool width is approximately equal to the distance between opposed points along first and second half nut 7014a/b interior surfaces, between the interrupted thread portions 7144 and 7146 such that tool 7180 may be inserted in-between the half nuts and to engage against the thread edges an rotate the half nuts to pre-engage the semi-circular depressions 7166 and 7168. Curved inset 7190 is provided to allow insertion around a threaded rod R.

Figure 41:
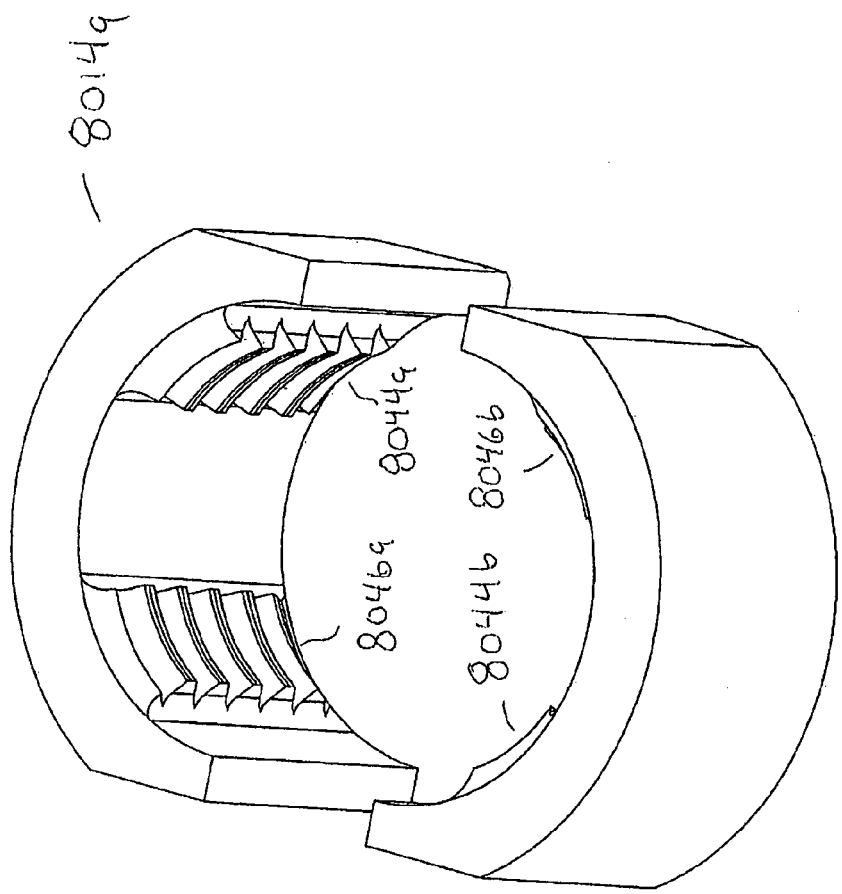
FIG. 41 shows a bottom perspective view of a pair of half nuts of an eighth embodiment.

Referring to FIG. 41, a pair of half nuts 8014a and 8014b of an eighth embodiment is shown, generally similar to the first embodiment but including interrupted female thread portions 8044a/b and 8046a/b, each of the interrupted female thread portions having a cutting edge.

The seventh embodiment adapted to repair damaged threads, although described separately, may be combined with the other embodiments adapted as fasteners. A set of first and second half nuts having thread cutting edges, 7014a&b or 8014a&b may be interchangeable with half nut sets 14a&b, 1014a&b, 2014a&b, 3014a-f, etc. For instance, referring to FIGS. 16 and 17 demonstrating use of a common nut housing with a plurality of sets of half nuts 3014a,b, 3014c,d and 3014e,f adapted for different thread sizes, the plurality of sets may include one or more sets of half nuts having thread cutting edges 7014a,b adapted for use in the same nut housing 3070. If damaged or galled threads are encountered while applying one of the fastener sets 3014a-f, the apparatus may be disassembled in place, the half nut set 3014 removed and a half nut set 7014a,b for the required thread size having a cutting edge inserted into the nut housing 3070 with the first and second plates, compression member and retaining element reassembled in place below the damaged area. As the assembly is rotated in the "unthreading" direction, the cutting edges will be compressed against the male threads removing burrs and/or realigning thread ridges as they move along the male threaded member. When the damaged thread portion is repaired, the cutting edge half nuts 7014a,b may be swapped in place with the appropriate fastener half nut set 3014a-f, and the fastener system torqued into place. The flexibility to exchange compression half nut sets with cutting edge half nut sets in-place, and back again, provides significant savings in time and material at the job site. Additionally, all of this may be accomplished using a common nut housing for a variety of male thread sizes, thereby markedly decreasing the number of parts required for inventory, and reducing time lost to mistakes in selecting the wrong part size.

Figure 42:
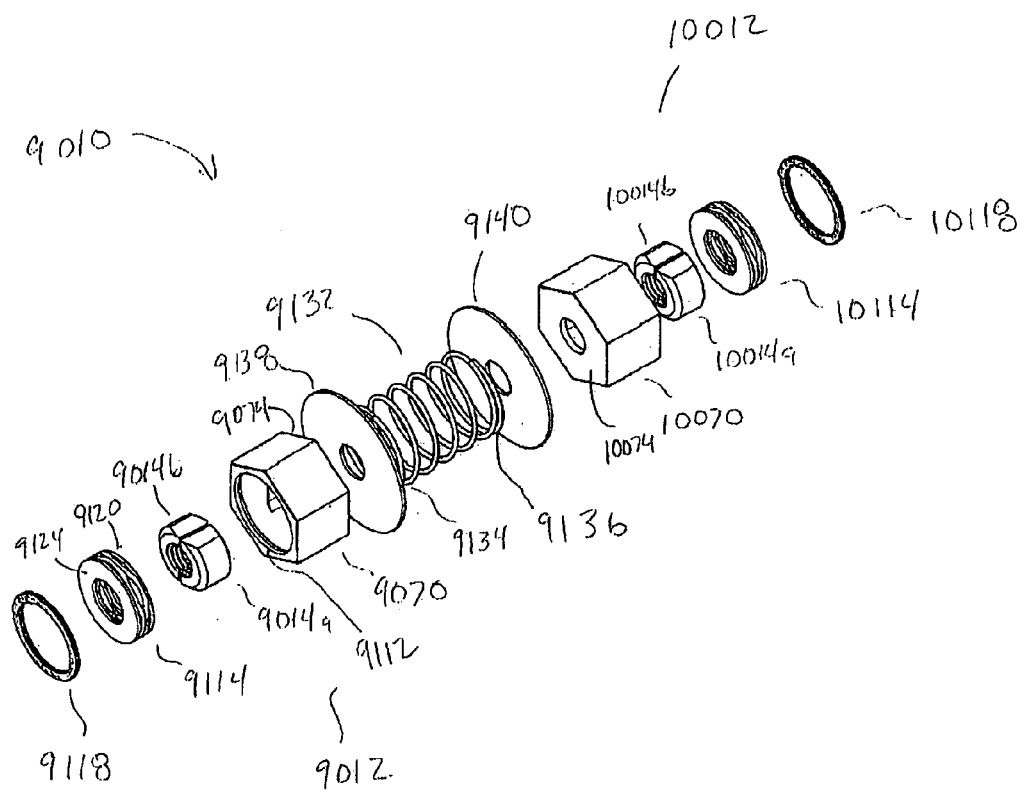
FIG. 42 shows an exploded view of a ninth embodiment in an opposing horizontal stacked configuration.
Figure 43:
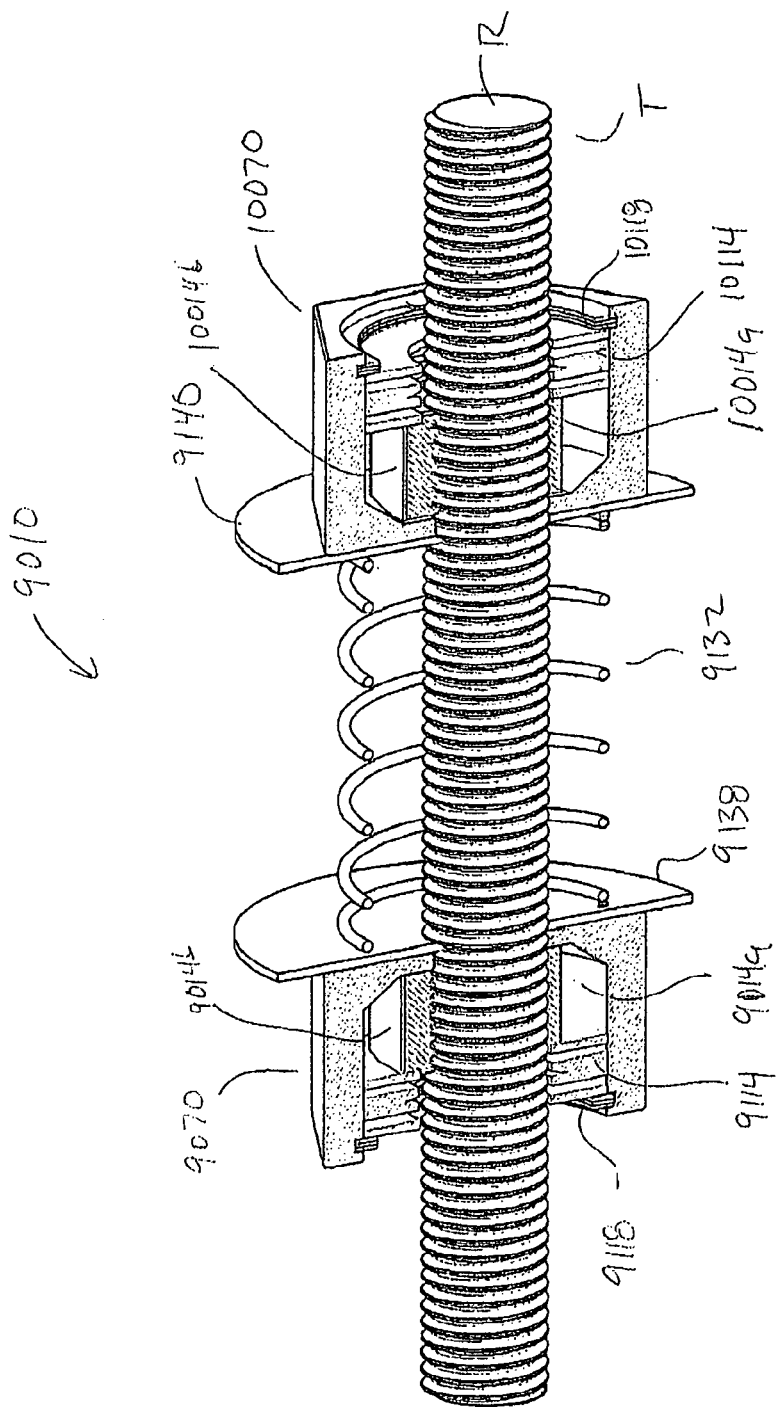
FIG. 43 shows a cutaway side view of a ninth embodiment in an opposing horizontal stacked configuration.
Figure 44:
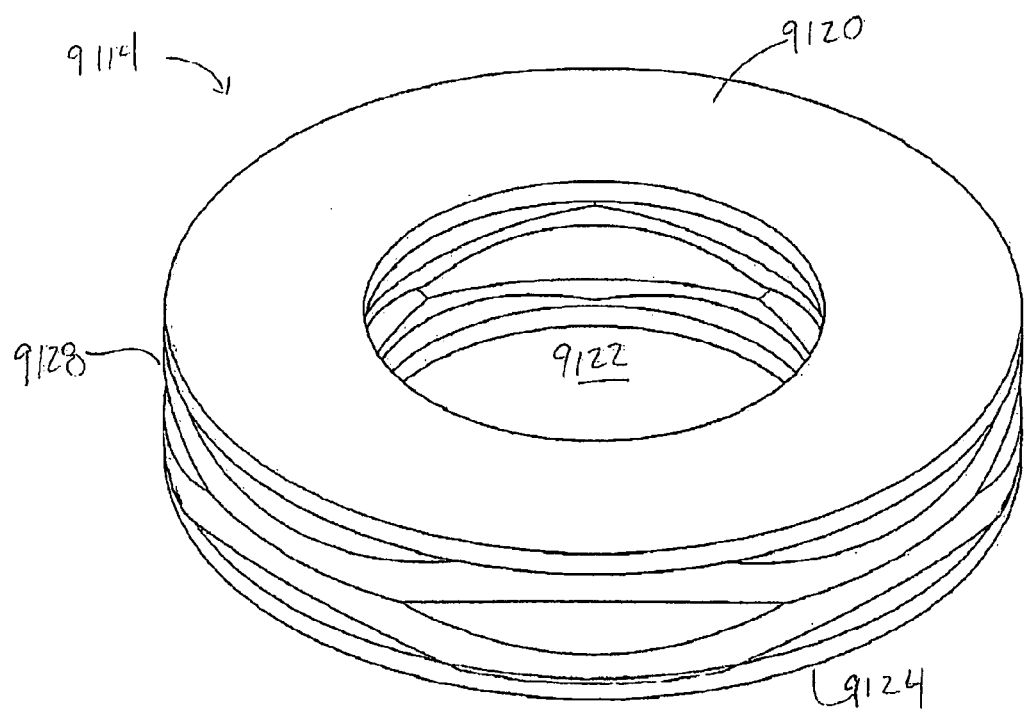
FIG. 44 shows a perspective view of a wave spring compression portion of a ninth embodiment.
Figure 45:
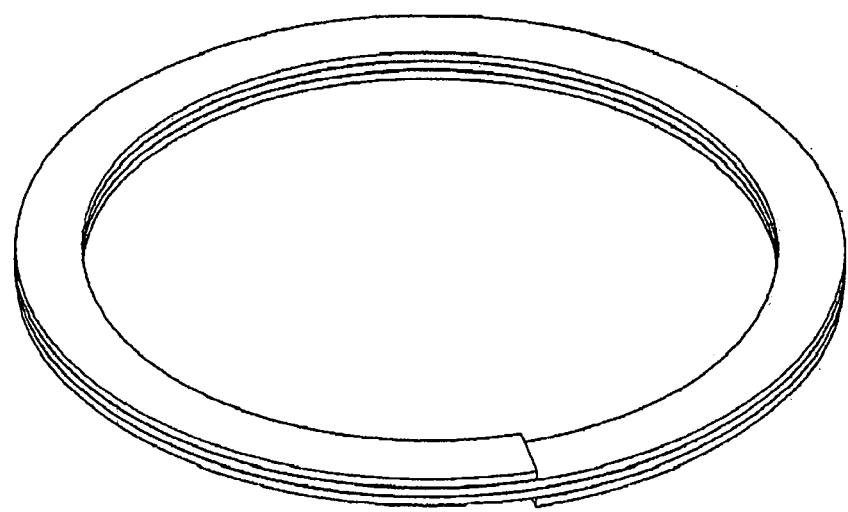
FIG. 45 shows a perspective view of a flat coil retaining element of a ninth embodiment, compressed.
Figure 46:
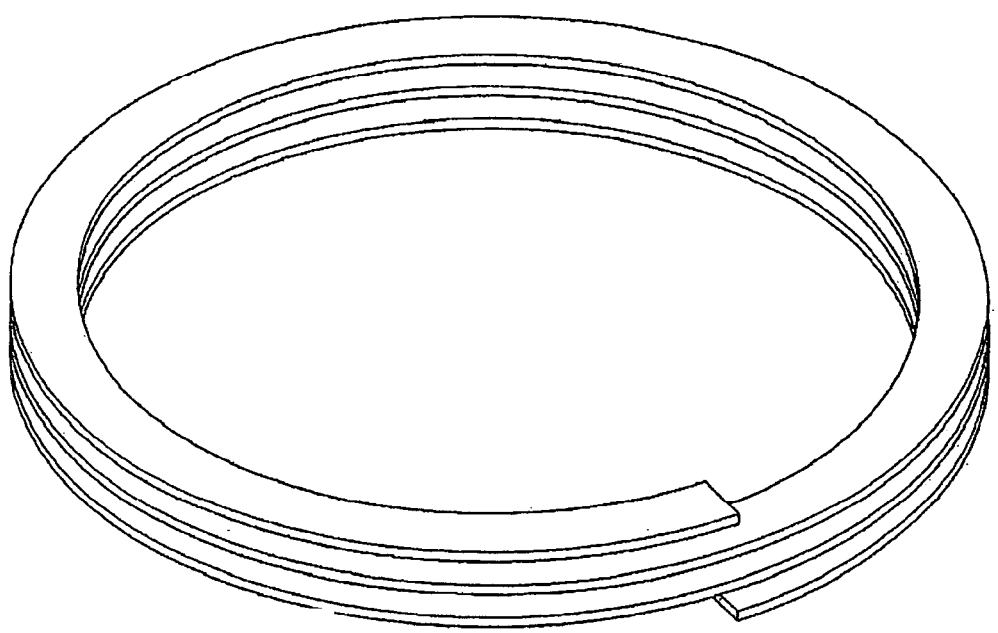
FIG. 46 shows a perspective view of a flat coil retaining element of a ninth embodiment, expanded.

Referring to FIGS. 42-47 a ninth embodiment 9010 is shown, similar to the first described embodiment, including a first nut assembly 9012 to couple to a male threaded rod R, the first nut assembly 9012 including opposed first and second half nuts 9014*a* and 9014*b*, a nut housing 9070 to receive the first and second half nuts 9014*a* & *b*, a compression portion 9114, and retaining element 9118. Referring to FIGS. 42, 43 & 44, compression portion 9114 comprises a resilient wave spring having a first a first end 9120 forming a plate to engage against first and second half nuts 9114*a*&*b*, and a second plate 9124 to engage against retaining element 9118. Wave spring 9114 is formed from a flat coil, such that first and second plates 9120 and 9124, respectively, are integral with the spring itself. Wave spring 9114 provides high compression force in a relatively compact form, and obviates the need for separate plates and resilient members, permitting a more compact nut housing 9070.

Referring to FIGS. 42, 43, 45 & 46, retaining element 9118 comprises a flat helical spring having two or three turns, which allows it to be compressed circumferentially to insert into nut housing 9070 and compressed axially to fit into channel 9112, and retained in place by friction when the compression is released. The nut assembly 9012 can therefore be assembled and disassembled without need for tools (such as a snap ring puller, as required for the first described embodiment).

Figure 47:
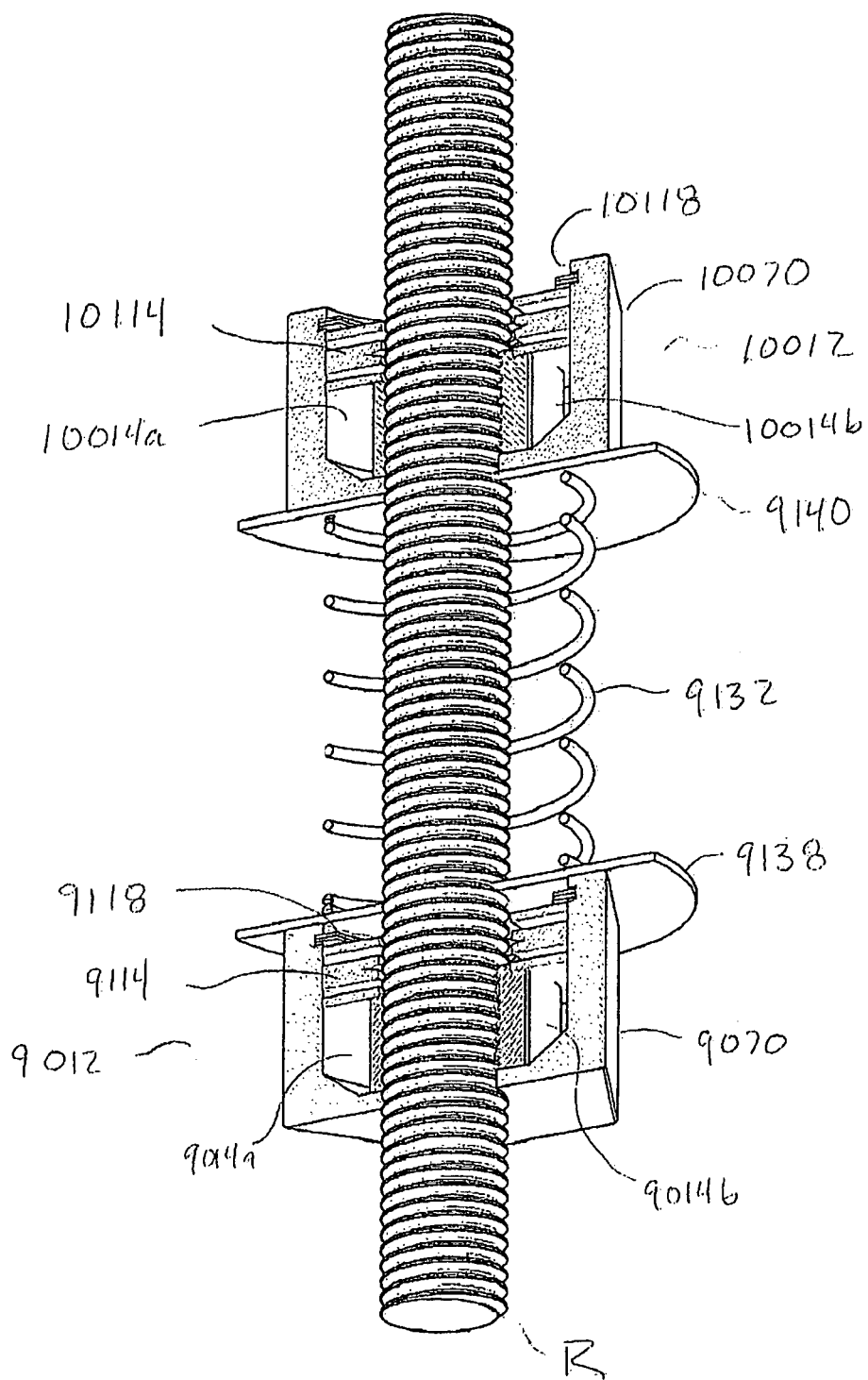
FIG. 47 shows a cutaway view of a ninth embodiment in an inline vertically stacked configuration.

Referring to FIGS. 42, 43 and 47 the configuration includes a second nut assembly 10012 which is identical to the first nut assembly 9012, including a nut housing 10070 to receive first and second opposed half nuts 10014*a*&*b*, compression portion 10114, and retaining element 10118. Interlineal compression member 9132 is disposed between the first and second nut assemblies 9012 and 10012. Interlineal compression member 9132 has a first end 9134 engaged against a first interlineal plate 9138, and a second end 9136 engaged against second interlineal compression plate 9140. In the embodiment, the interlineal compression element 9132 is a helical spring.

In the horizontal configuration shown in FIGS. 42 and 43, first and second interlineal compression plates 9138 and 9140 abut directly against the respective first and second nut housing end wall exterior faces 9074 and 10074. This opposing orientation may be especially useful for horizontally mounted fasteners, to prevent vibration and cyclic forces from loosening the fasteners over time. Additionally, this configuration may be useful with first and second nut assemblies 9012 and 10012 tightened against opposing surfaces of a plate or board, with interlineal compression member 9132 extending through an aperture in the plate or board.

In the vertically stacked configuration shown in FIG. 47, similar to the configuration shown in FIGS. 18 & 19, the second nut assembly acts as a keeper to prevent first nut assembly 9012 from working loose over time. Interlineal compression element 9132 maintains pressure on second nut assembly 10012 to maintain half nuts 10014*a*&*b* fully engaged, and provide some level of shock absorption.

Those skilled in the art will recognize that numerous modifications and changes may be made to the preferred embodiment without departing from the scope of the claimed invention. It will, of course, be understood that modifications of the invention, in its various aspects, will be apparent to those skilled in the art, some being apparent only after study, others being matters of routine mechanical, chemical and electronic design. No single feature, function or property of the preferred embodiment is essential. Other embodiments are possible, their specific designs depending upon the particular application. As such, the scope of the invention should not be limited by the particular embodiments herein described but should be defined only by the appended claims and equivalents thereof.

I claim:

1. A fastener system, comprising:
 a first nut assembly engageable with a male threaded rod, the first nut assembly including opposing first and second nuts,
 each first and second nut comprising:
  first and second end faces and a female threaded semicircular interior surface engageable with the male threaded rod, each of the first and second end faces extending from an interior edge to an exterior edge; and
  opposed parallel first and second exterior flats proximate the respective first and second end face exterior edges;
 a nut housing receiving the first and second nuts, the nut housing comprising:
  an end wall interior surface; and
  opposed parallel first and second interior flats projecting into an interior cavity of the nut housing, each of the first and second interior flats including an engagement surface configured to slidingly engage the nut exterior flats;
 a compression portion including a resilient member disposed within a nut housing cavity and urging the first and second nuts against the end wall interior surface; and
 a retaining element retaining the resilient member in the nut housing;
 wherein the nut housing further comprises a first aperture in a center of the end wall interior surface and the retaining element further comprises a second aperture in a center of the retaining element,
 wherein each of the first and second nuts further comprise a plurality of female threaded portions engageable with a selected male thread, each female threaded portion extending from a first thread edge to a second thread edge and having a selected thread depth, the first thread edge forming a thread cutting edge, and wherein an exterior surface of the nut housing is configured to engage with a torque device, and
 wherein the thread cutting edge is configured to form positive engagement around intermittent damaged regions of the male threaded rod, and wherein the exterior surface of the nut housing has a hexagonal profile configured to engage with a hex wrench.

2. The fastener system according to claim 1, wherein, when the thread cutting edge forms positive engagement with the intermittent damaged regions and the first nut assembly is rotated in a first direction, the thread cutting edge cuts and repairs the damaged regions on the male threaded rod, and wherein each of the first and second nuts comprises a first and second beveled surface proximate the first and second end faces, respectively.

3. The fastener system according to claim 1, where the thread cutting edge is interrupted where gaps are formed between sections of the thread cutting edge.

4. A fastener system comprising:
 a first nut assembly to engage a male threaded rod, the first nut assembly including opposed first and second nuts, each first and second nut comprising:

opposed first and second axial ends, a distance between the axial ends defining a nut depth;

first and second end faces, each of the first and second end faces extending from an interior edge to an exterior edge and from the first to the second axial end, and parallel to each other;

a female threaded semicircular interior surface to engage a selected male thread, the threaded interior surface extending from a first thread edge proximate the first end face interior edge to a second thread edge proximate the second end face interior edge, and from the first to the second axial end, and having a selected thread depth;

opposed parallel first and second exterior flats proximate the respective first and second end face exterior edges, a distance between the first and second exterior flats defining a nut width;

a back wall extending between the first and second exterior flats and between the first and second axial ends, a maximum distance between opposed points on respective first and second nut back walls when the first and second nuts are fully engaged against the threaded rod defining a nut breadth; and a first bevel surface extending along an intersection of the back wall and the first axial end, defining a nut first beveled end and having a first bevel angle;

where, when the first and second nuts engage the threaded rod, the respective first and second end faces of the first and second nuts do not contact each other;

a nut housing to receive the first and second nuts, the nut housing comprising:

an end wall having exterior and interior surfaces and a center aperture, the end wall interior surface including a concave tapered portion centered on the center aperture and matching the first bevel angle to receive a nut beveled end, the end wall exterior surface having a flat face;

enclosing sidewalls extending from the end wall to an edge face and having exterior and interior surfaces, the edge face parallel to the end wall exterior surface, the sidewall exterior surfaces receiving a torque device, the interior surfaces of the end wall and sidewalls defining a cavity; and opposed first and second interior flats projecting into the cavity proximate the end wall interior surface, each of the first and second interior flats including an engagement surface and a first lip distal from the nut housing end wall interior surface, a distance between the engagement surfaces defining a slot width not less than the nut width so as to slidingly engage the nut exterior flats;

where a distance between sidewall interior surfaces across the cavity in an axis parallel to the interior flats defines a slot length greater than the nut breadth by at least the nut thread depth;

a compression portion comprising a resilient member disposed within the nut housing cavity to urge the first and second nuts against the end wall interior surface; and a retaining element;

where each first and second thread edge comprises a rounded edge extending from the first to the second axial end.

5. The fastener system according to claim 4, each of the first and second nuts further comprising a second bevel surface extending along an intersection of the back wall and the second axial end, defining a nut second beveled end and having a second bevel angle matching the first bevel angle.

6. The fastener system according to claim 4, the compression portion further comprising a first plate having a center aperture, the first plate movably disposed between the resilient member and the first and second nuts.

7. The fastener system according to claim 4, where the resilient member comprises at least one of a helical spring and a wave spring.

8. The fastener system according to claim 4, where each of the first and second nut back walls comprises an arcuate cross section and the nut housing end wall interior surface tapered portion forms a concave frustum centered on the aperture.

9. The fastener system according to claim 8, where the first and second nut arcuate cross sections are semi-circular, where the nut housing end wall frustum comprises a circular cross section, and where each of the nut housing first and second interior flats further include an opposed second lip proximate the end wall interior surface, such that the interior flats partially overhang the nut housing end wall frustum.

10. The fastener system according to claim 4, where each first and second nut and first and second thread edge includes a bevel extending from the first to the second axial end.

11. The fastener system according to claim 4, further comprising a plurality of sets, each set including opposed first and second nuts for a selected male thread size, each set for a different selected male thread size, where all of the sets have equal nut widths to engage the nut housing slot width and equal nut breadths, the breadth compatible with the nut housing slot length.

12. The fastener system according to claim 4, further comprising:

a second nut assembly to couple to the male threaded rod having a second nut assembly nut housing end wall exterior surface oriented against the first nut assembly nut housing edge face; and an interlineal compression member disposed between the first and second nut assemblies, the interlineal compression member having a first end engaged against the first nut assembly, and a second end engaged against the second nut assembly.

13. The fastener system according to claim 4, further comprising:

a vertical hold down including bottom and top brackets, the bottom bracket comprising a first flange having a first oversized aperture to receive the male threaded rod and a second flange extending from the first flange at an angle normal to the first flange, the top bracket comprising a first flange having a second oversized aperture to receive the male threaded rod and a second flange extending from the first flange at an angle normal to the first flange; and a plurality of fasteners, the bottom bracket first flange insertable over a threaded rod through the first oversized aperture against a horizontal member, and the bottom bracket second flange to go against a vertical member to be coupled to the horizontal member, the first nut assembly to insert over the threaded rod and against the bottom bracket first flange with the end wall exterior surface against the first flange, the top bracket to insert over the threaded rod to press the top bracket first flange tightly against the first nut assembly nut housing edge face and the top bracket second flange against the bottom bracket second flange, and the plurality of fasteners to couple to the vertical member through the top and bottom bracket second flanges.

14. The fastener system according to claim 4, where each female threaded semicircular interior surface further comprises a plurality of threaded portions, each threaded portion including a thread cutting edge.

15. A fastener system comprising:
- a first nut assembly engageable with a selected male threaded rod, the first nut assembly including opposing first and second nuts, each first and second nut including first and second end faces and a female threaded semicircular interior surface engageable with the selected male threaded rod, each of the first and second end faces extending from an interior edge to an exterior edge, the female threaded semicircular interior surface including a plurality of interrupted thread cutting edges configured to cut male threads in the selected male threaded rod;
- a nut housing receiving the first and second nuts and having an end wall interior surface and a nut housing cavity;
- a compression portion including a resilient member disposed within the nut housing cavity and urging the first and second nuts against the end wall interior surface; and
- a retaining element retaining the resilient member in the nut housing.

16. The fastener system according to claim 15, where a portion of the female threaded semicircular interior surface is tapered.

17. The fastener system according to claim 15, where the thread cutting edges cut and repair damaged sections of the male threaded rod when rotated in a first direction about the male threaded rod.

* * * * *